US007825343B2

(12) United States Patent  
Doerwald

(10) Patent No.: US 7,825,343 B2  
(45) Date of Patent: Nov. 2, 2010

(54) SYSTEMS AND METHODS FOR PROVIDING INFORMATION TO A CUSTOMER

(75) Inventor: Axel Doerwald, Mississauga (CA)

(73) Assignee: Invatron Systems Corp., Mississauga, Ontario (CA)

( * ) Notice: Subject to any disclaimer, the term of this patent is extended or adjusted under 35 U.S.C. 154(b) by 244 days.

(21) Appl. No.: 12/117,308

(22) Filed: May 8, 2008

(65) Prior Publication Data

US 2008/0277168 A1 Nov. 13, 2008

Related U.S. Application Data

(60) Provisional application No. 60/916,626, filed on May 8, 2007.

(51) Int. Cl.  
G01G 19/415 (2006.01)  
G06N 5/02 (2006.01)  
G01Q 30/00 (2010.01)  
G06K 15/00 (2006.01)

(52) U.S. Cl. ............... 177/25.15; 235/383; 705/14.38; 705/414

(58) Field of Classification Search ............ 177/4, 177/5, 25.15; 235/383; 705/14.38, 414, 705/415, 416  
See application file for complete search history.

(56) References Cited

U.S. PATENT DOCUMENTS

| 4,274,500 | A |   | 6/1981  | Kuhnle     |       |
|-----------|---|---|---------|------------|-------|
| 4,301,878 | A | * | 11/1981 | Soe        | 177/5 |
| 4,601,355 | A | * | 7/1986  | Takahashi  | 177/2 |
| 4,630,067 | A | * | 12/1986 | Teraoka    | 347/180 |
| 4,693,329 | A | * | 9/1987  | Hikita     | 177/4 |
| 4,832,513 | A | * | 5/1989  | Ikekita    | 400/61 |
| 4,965,825 | A |   | 10/1990 | Harvey et al. | |
| 5,045,283 | A |   | 9/1991  | Patel      | |
| 5,109,414 | A |   | 4/1992  | Harvey et al. | |
| 5,233,654 | A |   | 8/1993  | Harvey et al. | |
| 5,335,277 | A |   | 8/1994  | Harvey et al. | |
| 5,478,990 | A |   | 12/1995 | Montanari et al. | |
| 5,532,104 | A |   | 7/1996  | Goto       | |
| 5,578,797 | A | * | 11/1996 | Hewitt et al. | 177/5 |
| 5,711,160 | A |   | 1/1998  | Namisniak et al. | |
| 5,712,989 | A |   | 1/1998  | Johnson et al. | |
| 5,747,744 | A |   | 5/1998  | Kraft et al. | |
| 5,773,954 | A |   | 6/1998  | VanHorn    | |

(Continued)

OTHER PUBLICATIONS

Bacque Peter, "Weighty Issue High-Tech Checks Let Truckers Pass Inspection Quickly", Richmond Times, Richmond, VA: Jan. 11, 2001. p. C.1.

*Primary Examiner*—Randy W Gibson  
(74) *Attorney, Agent, or Firm*—Bereskin & Parr/S.E.N.C.R.L., s.r.l.

(57) ABSTRACT

Described embodiments relate to systems and methods for providing information to a customer. A weigh station has an input module for receiving a product identifier corresponding to a product and a scale for weighing the product. A storage module stores product information for a plurality of products. An information retrieval module identifies a related information profile from the product information based on the product identifier. An interactive customer display displays visual information based on the related information profile to the customer, which includes a plurality of customer-selectable items. The interactive customer display includes a customer-operated input module operable by the customer to select a selected item from the plurality of customer-selectable items.

24 Claims, 15 Drawing Sheets

U.S. PATENT DOCUMENTS

| | | | |
|---|---|---|---|
| 5,821,512 A | 10/1998 | O'Hagan et al. | |
| 5,887,243 A | 3/1999 | Harvey et al. | |
| 5,893,717 A | 4/1999 | Kirsch et al. | |
| 6,009,400 A | 12/1999 | Blackman | |
| 6,024,149 A | 2/2000 | Bernhard et al. | |
| 6,105,866 A * | 8/2000 | Morrison et al. | 235/383 |
| 6,321,984 B1 | 11/2001 | McCall et al. | |
| 6,327,576 B1 | 12/2001 | Ogasawara | |
| 6,363,366 B1 | 3/2002 | Henty | |
| 6,373,573 B1 | 4/2002 | Jung et al. | |
| 6,424,949 B1 | 7/2002 | Deaton et al. | |
| 6,434,530 B1 | 8/2002 | Sloane et al. | |
| 6,456,981 B1 * | 9/2002 | Dejaeger et al. | 705/14.38 |
| 6,491,217 B2 | 12/2002 | Catan | |
| 6,530,521 B1 * | 3/2003 | Henry | 235/383 |
| 6,543,684 B1 * | 4/2003 | White et al. | 235/379 |
| 6,549,135 B2 | 4/2003 | Singh et al. | |
| 6,557,760 B2 | 5/2003 | Goodwin, III | |
| 6,587,739 B1 | 7/2003 | Abrams et al. | |
| 6,587,835 B1 | 7/2003 | Treyz et al. | |
| 6,616,047 B2 | 9/2003 | Catan | |
| 6,676,014 B2 | 1/2004 | Catan | |
| 6,758,397 B2 | 7/2004 | Catan | |
| 7,026,556 B1 | 4/2006 | Schuller | |
| 7,041,915 B2 * | 5/2006 | Kasinoff | 177/25.15 |
| 7,050,991 B2 | 5/2006 | Ogasawara | |
| 7,099,038 B2 | 8/2006 | Schuller | |
| 7,214,891 B1 * | 5/2007 | Hewitt et al. | 177/4 |
| 7,416,117 B1 * | 8/2008 | Morrison | 235/383 |
| 7,464,872 B2 | 12/2008 | Doerwald | |
| 7,597,254 B2 * | 10/2009 | Miller et al. | 235/383 |
| 2003/0130891 A1 | 7/2003 | Jacobs | |
| 2003/0130965 A1 | 7/2003 | Jacobs et al. | |
| 2003/0205412 A1 | 11/2003 | Hewitt et al. | |
| 2003/0218330 A1 | 11/2003 | Mortimer | |
| 2003/0220836 A1 | 11/2003 | Mortimer | |
| 2004/0049422 A1 * | 3/2004 | Mortimer | 705/14 |
| 2004/0134823 A1 | 7/2004 | Bitsonis | |
| 2004/0193497 A1 | 9/2004 | Tanaka | |
| 2004/0204992 A1 * | 10/2004 | Doerwald et al. | 705/14 |
| 2005/0154641 A1 * | 7/2005 | Mortimer | 705/14 |
| 2007/0005379 A1 * | 1/2007 | Juan-Castellanos et al. | 705/1 |
| 2007/0043621 A1 | 2/2007 | Collins et al. | |
| 2010/0049616 A1 * | 2/2010 | Hipsher | 705/21 |
| 2010/0057661 A1 * | 3/2010 | Otto et al. | 706/47 |
| 2010/0185483 A1 * | 7/2010 | Collins et al. | 705/9 |
| 2010/0191588 A1 * | 7/2010 | Doerwald et al. | 705/14.13 |

* cited by examiner

Figure 12

Nutritional Facts per Salmon Steak 0 grams carbohydrates 0 grams fiber 14 grams protein 12 grams fat 173 calories

Figure 13

Salty Salmon with Dill (1) 4 salmon steaks (2) 1/2 cup dill sauce (3) 2 tbsp. of capers (4) 2 tbsp. of lemon juice (5) 1/2 cup of *Hellman's*™ mayonnaise Combine all ingredients, except salmon, in a bowl. Spread over salmon. Bake at 375° for 20 min.

(recipe)

Figure 16

Salty Salmon with Dill

① 4 salmon steaks

② 1/2 cup dill sauce (select for coupon!)

③ 2 tbsp. of capers

④ 2 tbsp. of lemon juice

⑤ 1/2 cup of mayonnaise

Combine all ingredients, except salmon, in a bowl. Spread over salmon. Bake at 375° for 20 min.

Figure 18
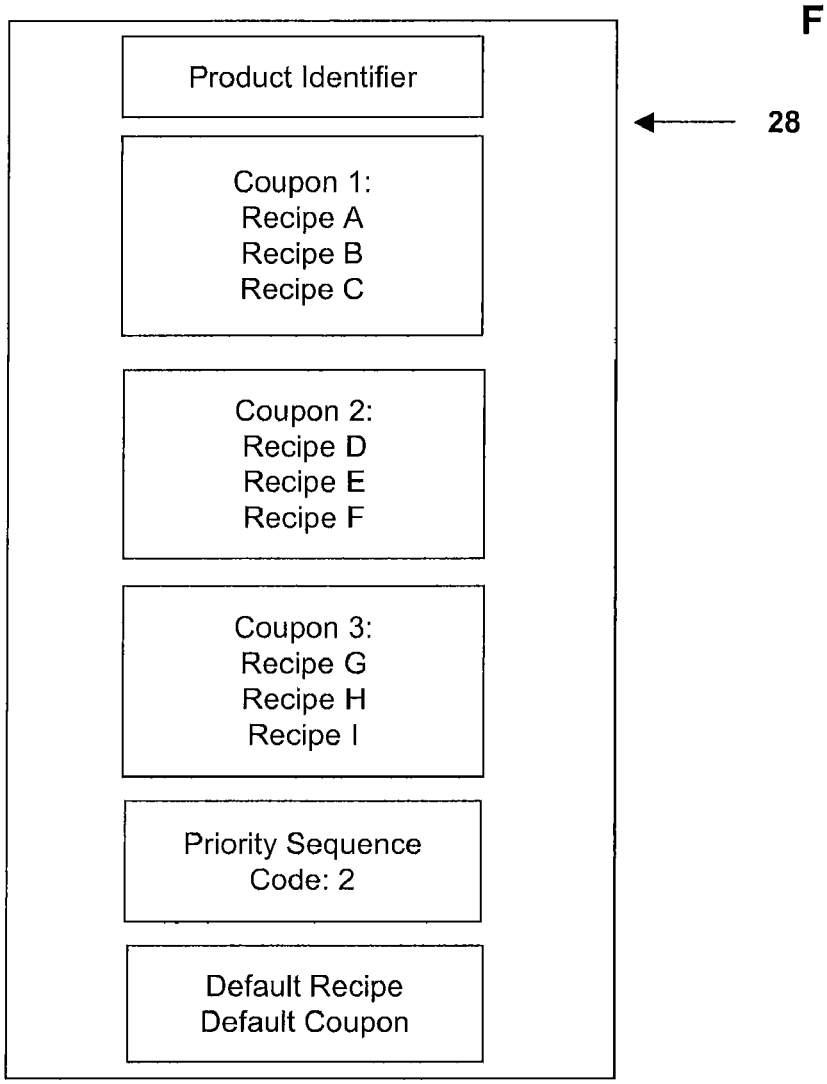
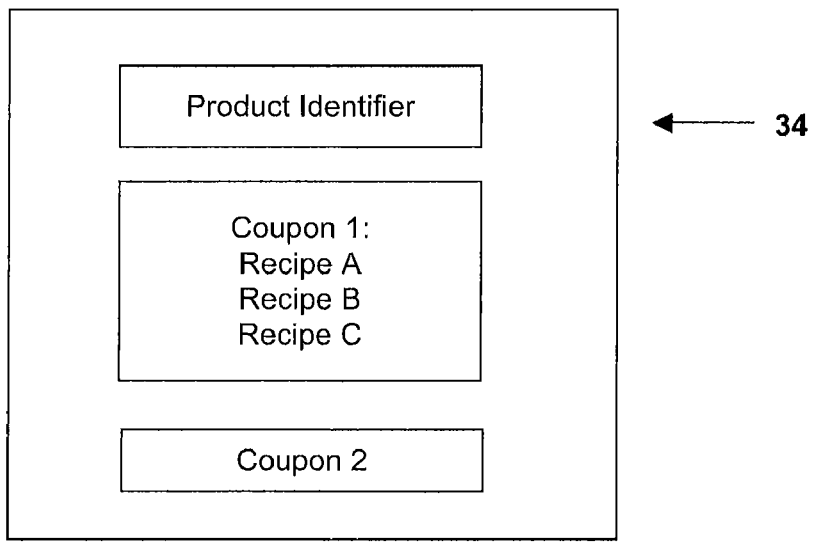

SYSTEMS AND METHODS FOR PROVIDING INFORMATION TO A CUSTOMER

CROSS-REFERENCE TO RELATED APPLICATIONS

This application claims the benefit of U.S. Provisional Patent Application No. 60/916,626 filed May 8, 2007, the entire contents of which is hereby incorporated by reference.

FIELD

Embodiments described herein relate generally to systems and methods for providing information to a customer. More particularly, embodiments described herein relate to systems and methods for providing information to a customer at a weigh station at which the customer is being served.

BACKGROUND

In retail environments, such as a grocery store, there are generally one or more full-service departments to provide requested products to customers. These full-service departments have weigh stations for use by an operator to weigh and/or label the requested products. In addition, self-service departments may exist where customers select their own product. These self-service departments generally operate similar to full-service departments and have self-service stations that include weigh stations for use by customers to weigh and/or label their own product.

An example full-service department is a Meat and Deli department where operators prepare (e.g. slice), weigh, label and package a requested product for the customer. The customer selects one or more products from a full-service department for purchase and requests a certain quantity of a product to be purchased. The quantity may be in terms of weight, number of slices, number of units, a particular length, and the like. If the customer requests a product sold by unit, it may be unnecessary to weigh the product on the weigh station. However, the weigh station may still be used to prepare the product, such as to generate a label to be affixed to a product package.

Regardless of whether the product is sold by weight or by unit, the product preparation requires a series of weighing and labeling transactions to be performed by an operator using a weigh station. Each product has an associated product code or a product identifier. The weigh station operator can input the product identifier into the weigh station so that a product price can be determined and/or a label can be generated. The label typically contains the product description, price per weight/unit, total package price, total package weight/units, the package date or sell by date and a UPC code containing a product code.

At the weigh station, the preparing, weighing and labeling transaction time can be short (e.g. a few seconds) or long (e.g. several minutes) depending on the number of products selected by the customer and complexity of the product preparation. While the preparation of the food product is occurring the customer has nothing to do but wait for the operator to finish preparing the product.

Accordingly, there exists an opportunity to provide information to a customer at a weigh station at which the customer is being served.

SUMMARY

In a first aspect, some embodiments provide a system for providing information to a customer. The system includes (1) a weigh station, the weigh station having an input module for receiving a product identifier corresponding to a product and a scale for weighing the product; (2) a storage module for storing product information for a plurality of products; (3) an information retrieval module for identifying a related information profile from the product information based on the product identifier, the information retrieval module being linked for communication to the input module and to the storage module; and (4) an interactive customer display for displaying visual information based on the related information profile to the customer, the interactive customer display being linked for communication to the information retrieval module to receive the related information profile. The visual information includes a plurality of customer-selectable items. The interactive customer display includes a customer-operated input module operable by the customer to select a selected item from the plurality of customer-selectable items.

In a second aspect, some embodiments provide a method for providing information to a customer. The method includes the steps of (1) storing product information for a plurality of products; (2) receiving a product identifier corresponding to a product at a weigh station comprising a scale for weighing the product; (3) identifying a related information profile from the product information based on the product identifier; and (4) establishing an interactive weigh station session between the customer and an interactive customer display having a customer operated input module. The interactive weigh station session includes: displaying visual information based on the related information profile, where the visual information includes a plurality of customer-selectable items; and receiving a selected item from the customer operated input module, the customer operated input module being operable by the customer to select the selected item from the plurality of customer-selectable items.

Additional aspects of various embodiments are identified and described in the following description of some example embodiments.

BRIEF DESCRIPTION OF THE DRAWINGS

Several example embodiments of the present invention will now be described with reference to the drawings, in which:

FIG. 12 shows a schematic diagram of an interactive customer display for displaying visual information including a nutritional statement to a customer in accordance with at least one embodiment;

FIG. 13 shows a schematic diagram of an interactive customer display for displaying visual information including a recipe listing a product by brand to a customer in accordance with at least one embodiment;

FIG. 16 shows a schematic diagram of an interactive customer display for displaying visual information including a recipe listing a discount product to a customer in accordance with at least one embodiment;

FIG. 18 shows a block diagram of an example product record and an example product cross-linking in accordance with at least one embodiment.

Figure 1:
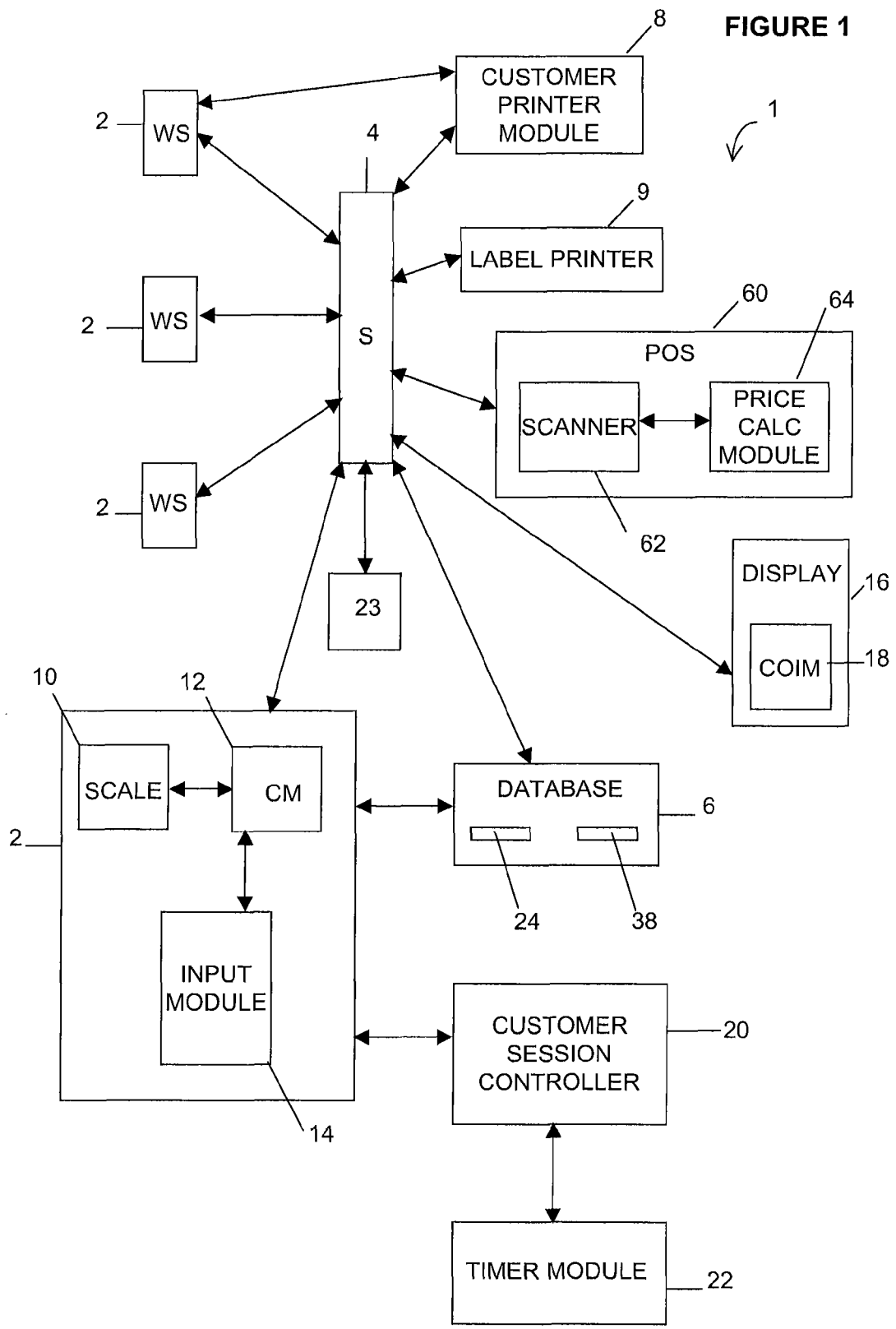
FIG. 1 shows a block diagram of a system for providing information to a customer in accordance with at least one embodiment.

A person skilled in the art will understand that the figures, described below, are for illustration purposes only. The figures are not intended to limit the scope of the embodiments described herein in anyway.

DETAILED DESCRIPTION OF EXEMPLARY EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more example implementations.

Reference is first made to FIG. 1, which shows a block diagram of a system 1 for providing information to a customer in accordance with at least one embodiment. System 1 may be implemented in a retail establishment, such as e.g. a grocery store, in a service department where a customer requests a product for purchase, which is generally sold by unit or weight and is prepared and labeled by an operator using a weigh station 2.

Generally, system 1 includes weigh station(s) 2, a storage module 24, an information retrieval module 38, and an interactive customer display 16 having a customer operated input module 18, where each may be connected via e.g. server 4.

Weigh station 2 includes an input module 14 for receiving a product identifier that corresponds to a particular product, and a scale 10 for weighing the product. Weigh station 2 may further include a communication module 12 for communicating with external devices such as e.g. server 4 and database 6. Although not shown, it will be appreciated that the weigh scale 2 may include additional components such as a working memory to load and store data, a database, a processor for executing a computer program product, and a computer program product in order to implement the various features of the system 1 described herein.

Figure 2:
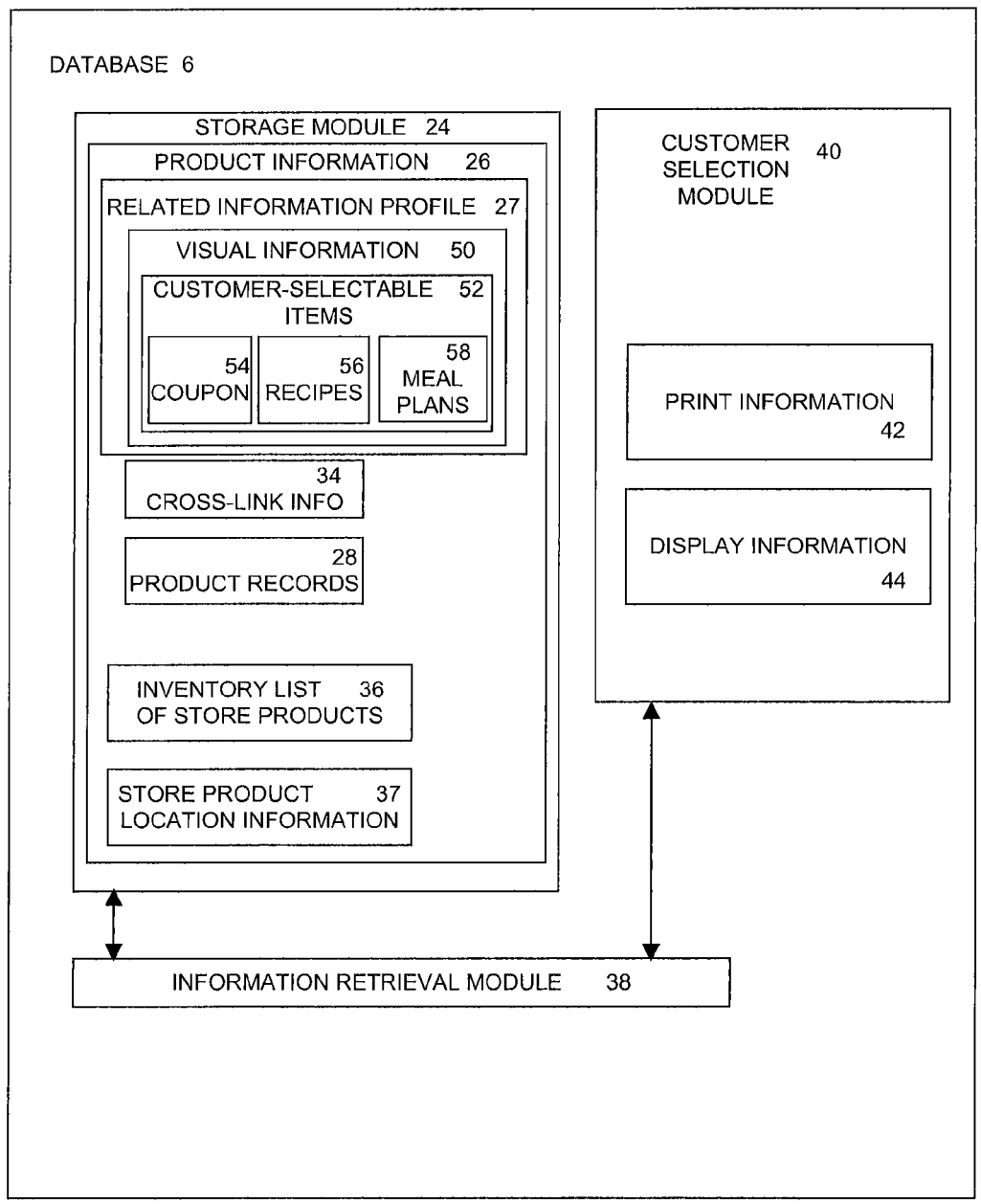
FIG. 2 shows a block diagram of an example embodiment of the database shown in FIG. 1.

The storage module 24 and the information retrieval module 38 may be implemented within a database 6, an example of which is shown in FIG. 2. As will be appreciated, database 6 may be implemented using one or more processors, file systems, databases, or combinations thereof. The database 6 may be embedded within the weigh station 2 or may be external to the weigh station 2 and linked to it locally or remotely over a network or via server 4. Moreover, some or all of the contents of database 6 may be synced with or copied on one or more external databases (not shown) that are linked to server 4 containing a processor for executing computationally intensive tasks.

Generally, the storage module 24 stores product information 26 for a plurality of products. The information retrieval module 38 is configured to identify a related information profile 27 from the product information 26 based on the product identifier received by the input module 14 of weigh station 2. The information retrieval module 38 is linked for communication to the input module 14 via e.g. server 4 or directly via the communications module 12. Alternatively, the storage module 24 and/or the information retrieval module 38 may be implemented within the server 4 or the weigh station 2.

Interactive customer display 16 displays visual information 50 to the customer based on the related information profile 27 identified by the information retrieval module 38. The interactive customer display 16 is linked for communication to the information retrieval module 38 via e.g. server 4 to receive the related information profile 27. As shown in FIG. 2, the visual information 50 includes a plurality of customer-selectable items 52. Examples of customer-selectable items 52 include display items that correspond to coupons (i.e. discounts) 54, recipes 56, meal plans 58 and store product location information 37. Although the interactive customer display 16 is illustrated as being external to the weigh station 2, it may also be internal and form part of the weigh station 2.

The interactive customer display 16 includes a customer-operated input module 18, which may be operable by the customer to select a selected item from the plurality of customer-selectable items 52 displayed on the interactive customer display 16. Examples of customer-operated input modules 18 include a touch-screen, a keypad, a button, a computer mouse, a joystick, a microphone, a pressure sensor and a variety of other user interface devices.

In at least one embodiment, the customer-operated input module 18 includes an active portion of the interactive customer display 16, such as a touch-screen display, where the active portion is touchable by the customer to select the selected item from the plurality of customer-selectable items 52.

Weigh stations 2 may include or be connected to an additional display screen (not shown) as required by the various Weights and Measures Regulations in the United States and Canada. In order to conform with regulations, the name of the product selected for purchase, the current weight of the product selected for purchase, the price per pound, kilogram and the total price of the transaction based on the amount of product selected for purchase may be displayed to the customer. This information may be displayed to the customer using the additional display screen facing the customer. The additional display screen facing the customer, as required by the regulations described above, may form a portion of the interactive customer display 16, or it may be an additional, separate and non-interactive display (not shown).

In accordance with at least one embodiment, the interactive customer display and the weigh station are located in a store. In such case, the product information 26 may include an inventory list for identifying a plurality of store products referred to herein as an inventory list of store products 36, as shown in FIG. 2. Each store product 36 may be available in the store. Each of the customer-selectable items 52 may identify at least one store product in the plurality of store products 36.

The product information may include store product location information for indicating the associated location for each store product in the inventory list of store products 36, which will be referred to herein as corresponding store location information 37.

The customer-selectable items 52 may identify one or more store products 36. At least one of the interactive customer display 16 and the customer-selectable print item may be configured to identify the associated location in the store of the at least one store product, as indicated by the corresponding store location information 37. The inventory list of store products 36 may also include the quantity of each store product that is currently in stock in the particular retail establishment.

In some embodiments, each of the customer-selectable items 52 may identify a store product 36 that differs from the product requested by the customer. For example, the store product 36 may be a competitive product or a complementary product, as will be explained herein.

Although the inventory list of store products 36 is illustrated as being part of the product information 26 (i.e. local to the database) it may also be remote to database 6. It may be in a different database such as e.g. a retail establishment's inventory system. The database 6 may be linked to the inventory system via server 4 in order to access the list of store products 36 and/or corresponding store location information 37.

The location of a particular store product 36 may be manually recorded in the list of store products 36 by a professional service person. Alternatively, the location of a store product 36 may be automatically and dynamically determined by a system employing radio frequency identification tags or by the use of a barcode reader with GPS functionality used by a store personnel to manually scan a product, etc.

Referring back to FIG. 1, in at least one embodiment, system 1 may further include a customer printer module 8 for printing a customer-selected print item based on the selected item selected by the customer using the customer-operated input module 18 from the plurality of customer-selectable items 52 displayed on the interactive customer display 16. The customer printer module 8 can be linked for communication to the interactive customer display 16 by e.g. server 4.

For example, the interactive customer display 16 may display numerous customer-selectable items 52, each corresponding to a discount coupon that can be offered to a customer. The customer may select the discount coupon (a customer-selectable item 52) that the customer wishes to receive using the customer-operated input module 18. When the desired discount coupon is selected, the customer printer module 8 prints a customer-selected print item, which, in this example, would be a version of the selected discount coupon.

In at least one embodiment, the customer printer module 8 may be accessible by the customer so that the customer will be able collect the customer-selected print item(s). Access to the customer printer module 8 may also be restricted and it may only be accessible by the operator, where the operator may then hand the customer-selected print item(s) to the customer. The customer printer module 8 may be configured to print the customer-selected print item(s) on a non-adhesive media, so that the customer-selected print items are not sticky and are easy for the customer to handle. The non-adhesive media may be paper, cardboard, plastic or any other suitable media.

The customer printer module 8 may be any suitable printer known in the art that can be configured to print on e.g. non-adhesive media as described above. For example, the customer printer module 8 may be a thermal printer, a laser printer or an inkjet printer and may be operable to print on the non-adhesive media in black and white, grayscale or colour. In addition, although customer printer module 8 is illustrated as being external to the weigh station 2, it may also be internal and form part of the weigh station 2.

In at least one embodiment, the system 1 includes a point of sale station 60 where the customer may purchase the product. In such an embodiment, the plurality of customer-selectable items 52 may relate to one or more store products 36 as will be described in detail in relation to FIG. 2. Each customer-selectable item may include a discount code for specifying a discount for the store product(s) 36 identified by the customer-selectable item, as will be explained in detail in relation FIG. 2. In at least one embodiment, each customer-selectable item may include a discount for one or more store product(s) 36.

The point of sale station 60 can include a scanner 62 for scanning the discount code and a price calculation module 64 for calculating a total purchase price based on a price of the product and the at least one store product less the discount. The scanner 62 may be linked for communication to the price calculation module 64, and in some embodiments to the interactive customer display 16. The scanner 62 may be implemented as e.g. a keypad input, where an operator at the point of sale station 60 may manually input the discount code using the keypad input. The scanner may also be implemented as an optical, magnetic or other type of scanner suitable for reading a discount code.

In at least one embodiment, the system 1 can include a customer session controller 20 operable by an operator for indicating when a customer session begins and ends. A customer session may be the period of time an operator at weigh station 2 is serving a customer. The customer session controller 20 may be a button, linked to the weigh station 2 and operable by the weigh station operator. As an example, when a new customer approaches the weigh station 2 and requests a particular product, the operator may activate the customer session controller 20 to begin a customer session. When the operator has finished serving the customer the requested product(s), the operator may re-activate the customer session controller 20 to end the customer session.

Alternatively, the customer session may be defined as starting when the operator enters a product identifier and ending when a different product identifier is entered, even if the same customer requests both products. The customer session controller 20 may be automatically activated when an operator enters the product identifier into the input module 14 and automatically re-activated when a new product identifier is entered into the input module 14.

Defining a customer session may be useful for limiting the number of customer-selectable items the customer may be permitted to select for printing in a given customer session. In at least one embodiment, the system 1 may further include a disabling module 23. The disabling module 23 may render the selected item from the customer-selectable items 52 no longer selectable by the customer for printing during the customer session. Alternatively, the disabling module 23 may render all the customer-selectable items 52 no longer selectable by the customer for printing during the customer session.

For example, the system 1 may be configured such that a customer may only be able to print one specific customer-selected print item a single time per customer session. If a customer has already printed a specific customer-selected print item during a customer session, the disabling module 23 may render the corresponding customer-selectable item (e.g. a coupon item displayed on the customer interactive display 16) that has been previously selected for printing during the customer session no longer selectable by the customer for printing.

Alternatively, a customer may only be able to print one customer-selected print item per customer session. In such an embodiment, the disabling module 23 may render all customer-selectable items to be no longer selectable by the customer after the first customer-selected print item had been printed on the customer printer module 8. For example, after a customer selects one customer-selectable item 52 (e.g. a coupon) for printing, the customer may no longer be able to select any other customer-selectable items 52 (e.g. other coupons) for printing.

Various other customer-selectable items 52 may be used such as e.g. recipes 56, meal plans 58, nutritional statements and store product location information 37. Rendering a customer-selectable item no longer selectable may be achieved in various ways. For example, the disabling module 23 may refresh the interactive customer display 16 so that the selected customer-selectable item is no longer displayed on the interactive customer display 16. Alternatively, the disabling module 23 may change the color or shade of the selected customer-selectable item so that it is displayed differently than other currently selectable customer-selectable items 52 displayed on the interactive customer display 16.

In at least one embodiment, the system 1 includes a timer module 22 for determining and storing a customer session duration using a timer. The timer starts when the customer session starts and the timer stops when the customer session ends.

The timer module 22 may be linked to the customer session controller 20. When the customer session controller 20 is activated, the timer module 22 can start the timer, and when the operator re-activates the customer session controller 20, the timer module 22 can stop the timer and record the duration of that particular customer session. Recording the duration of a customer session may be helpful for a retailer to determine how long it takes an operator to serve a customer, the average length of a customer session, or how long it takes to serve a particular product.

In addition to the customer printer module 8, the system 1 may include a label printer 9 for printing label items. The label printer 9 may be internal to the weigh station 2 or external and linked thereto via e.g. server 4 and communication module 12. The label printer 9 may be configured to print on adhesive media such that the printed label items have an adhesive back surface that can be secured to the product being handled and packaged by the system operator. That is, the label item is attachable to the product. Even in such an embodiment, the customer printer module 8 can be operable to print the customer selected print item on a non-adhesive media. While the system 1 shown in FIG. 1 is shown having two printers (the customer printer module 8 and the label printer 9), the system 1 may be configured to operate using a single printer.

In some embodiments, when the customer selected print item is printed, the interactive customer display 16 may be configured to refresh and display a second plurality of customer-selectable items 52 based on the product and the customer selected print item. The information retrieval module 38 may identify the second plurality of customer-selectable items 52 in the product information 26. The customer-operated input module 18 can be operable by the customer to select a second selected item from the second plurality of customer-selectable items 52. The customer printer module 8 can be operable to print a second customer selected print item based on the second selected item.

Referring back to FIG. 2, various example embodiments of the database 6 of FIG. 1 will be explained in detail.

As above, in at least one embodiment, the database 6 may include an inventory list of store products 36 and corresponding store product location information 37. Database 6 may be configured such that each store product listed in the inventory list of store products 37 has a corresponding related information profile 27, linked thereto via a corresponding product identifier as entered by the operator into the input module 14 of weigh station 2.

In another embodiment, the product information 26 and, specifically the recipe collections 56 and the list of coupons 52, may not be stored in database 6 and may instead be stored on an external database having a processor and linked to server 4. This may be advantageous if the recipe collection 56 and the coupons 52 require a significant amount of memory and database 6 may have limited memory located within the weigh station 2. In such a configuration computationally intensive identification of related information profiles 27 via e.g. searching may be conducted using server 4 and the external database. The search results may be subsequently downloaded and stored on database 6 and/or weigh station(s) 2 for identification and use by information retrieval module 38, such that server 4, database 6 and weigh station 2 operate in a conventional client-server configuration. For simplicity of explanation, in the description that follows all the contents of the product information 26 will be contained within database 6.

The information retrieval module 38 may identify the related information profile 27 in the product information 26 using various methods. The information retrieval module 38 may be operable to connect to server 4 linked to either database 6 or an external database containing a copy of the product information 26, and use server 4 to execute computationally intensive tasks involved in identifying a related information profile 28.

In at least one embodiment, the product information 26 may include cross-linking information 34 and/or product records 28, as will be explained in detail. The information retrieval module 38 may be operable to identify a related information profile 27 using the product cross-linking information 34 and/or product records 28.

The product-cross linking 34 and details relating to how the product-cross linking 34 can be established will be explained in more detail below in relation to FIGS. 17 and 18. For example, the product cross-linking 34 may link the requested product via the product identifier to various customer-selectable items 52, including coupons 54, recipes 56 and meal plans 58.

As another example, the related information profile 27 may include one or more customer-selectable items 52 corresponding to discount coupons 54 indicating a discount on an associated discount product. The information retrieval module 38 may identify one or more discount coupons 54 associated with a competitive or complementary discount product using the cross-linking information 34.

Generally, a competitive product may be a discount product corresponding in product type to the selected product but differing in product brand. For example, the selected product may be Maple Leaf™ smoked ham, where its product type is ham and its product brand is Maple Leaf™, which is identified by the product description. If the selected product is Maple Leaf™ smoked ham, then a competitive discount product may be Pillers'™ smoked ham, as the product types are both ham, but the product brands differ. The product information 26 may include a product type and a product brand for one or more products linked via the respective product identifier. The information retrieval module 38 can identify a related information profile 27 for a competitive product based on the product identifier for the selected product, where the competitive product has an associated discount coupon.

Generally, a complementary product may be a product that is likely to be used with the selected product. For example, if the selected product is salmon steaks then the product cross-linking information 34 may link to a complementary discount product such as dill sauce, where a discount is available for the dill sauce. Determining whether two products are likely to used together may be based on numerous factors, such as the product name (indicated by the product description) or recipes from the recipe collection 56 in the related information profile 27. Determining complementary products may also be implemented using meal plans 58. For example, a meal plan may indicate that salmon steaks go well with Lipton Sidekicks™ butter and herb noodles, which may happen to be a discount product, i.e. a discount coupon is available for the Lipton Sidekicks™ butter and herb noodles. In this example, the salmon steaks would be linked to the complementary Lipton Sidekicks™ butter and herb noodles (i.e. a discount product) via the product cross-linking information 34.

In at least one embodiment, the information retrieval module 38 identifies the related information profile 27 by the searching the storage module 24. This may involve searching the product information 26 (located either within database 6 or on an external database), using the product identifier linked to the related information profile 27. Searching will be explained in more detail in relation to FIGS. 7 and 17. Moreover, the information retrieval module 38 may conduct a pre-search in order identify a related information profile 27 linked to the product identifier, the results of which may be stored locally on the weigh station 2 and identified by the information retrieval module 38 at a later time.

The information retrieval module 38 may also identify a related information profile based on one or more product records 28 for the selected product. For example, the product record 28, linked to the selected product via the product identifier, may include one or more default discount coupons (or other customer-selectable items 52) indicating a discount on an associated discount product or one or more default recipes involving the product, or both. In such a case, the identified related information profile 27 may include the default discount coupon, the default recipe or both. For example, the default discount coupon for salmon steaks may be dill sauce and the default recipe may be "Salty Salmon with Dill". The product record 28 and the details relating to how the product record 28 may be created/updated will be explained in detail herein in relation to FIGS. 17 and 18.

The storage module 24 may include a list of discount products (discount coupons 54) and recipes 56. The information retrieval module 38 may identify the related information profile 27 by searching the recipes 56 for a recipe involving the product using the product identifier. The related information profile 27 may include the one or more recipes 56.

The information retrieval module 38 may be operable to search the recipes 56 using both the product identifier and the list of discount products to identify one or more recipes. The information retrieval module 38 may be configured to identify one or more recipes from the recipes 54 if the recipe(s) involve both the product and a discount product on the list of discount products 30.

As a simplified example, assume the requested product is salmon steaks, a discount product is dill sauce, and that black bean sauce is not on the list of discount products. Assume also that the recipes 56 contains two recipes, where one recipe involves the salmon steaks and dill sauce and the other recipe involves salmon steaks and black bean sauce. The information retrieval module 38 identifies the recipe involving dill sauce over the recipe involving black bean sauce. This may be implemented by attaching a higher weight to recipes involving both the product and a discount product (i.e. higher than that attached to recipes that do not involve both), where the information retrieval module 38 identifies recipes with a higher weight over recipes with a lower weight (i.e. those that do not involve a discount product or involve fewer discount products).

As noted above, the product information 26 may also include an inventory list of store products 36 and corresponding store product location information 37. In some embodiments, the information retrieval module 38 may be operable to search the recipes 54 using both the product identifier and the inventory list of store products 36 to identify one or more recipes 56. The information retrieval module 38 may be configured such that it is more likely to identify one or more recipes from the recipes 54 if the recipe(s) involve both the selected product and a store product on the inventory list of store products 36.

The identified product related information 27 may also include a meal plan 58 involving the selected product, cooking instructions for the selected product (e.g. baking/cooking temperature, baking/cooking time, etc.), or a nutritional information statement for the product (FIG. 12). These may be customer-selectable items 52 that can be selected by the customer and printed on the customer printer module 8. Both the meal plans 58 and the cooking instructions for the product may be generally referred to herein as recipes.

In some embodiments, the database 6 may further include a customer selection module 40. The customer selection module 40 may be configured to monitor what customer selectable items 52 are displayed to the customer. The customer selection module 40 may also be configured to monitor what customer selectable items 52 are subsequently selected by the customer as a selected item, for e.g. printing or otherwise. This print and display information may be stored by the customer selection module 40 in the database 6 as print information 42 and display information 44, respectively. The print information 42 may be useful for the retailer to e.g. charge a product supplier (i.e. a supplier of the discount product associated with the printed discount coupon) based on how many times a particular discount coupon linked to the product supplier is printed. Moreover, the display information 44 in combination with the print information 42 may also be useful for the retailer. For example, a retailer may be interested in determining how many times a particular selectable item is printed and displayed in order to better understand customer behavior. For example, if a particular discount coupon is printed one time for every two times it is displayed, while another discount coupon is printed one time for every ten times it is displayed, then a retailer may be interested in determining such information about the discount products.

In such an embodiment, the information retrieval module 38 may be operable to identify the related information profile 27 (and the customer-selectable items 52 therein) from the product information 26 based on the print information 42 and display information 44. The print information 42 and display information 44 may be linked to each product stored in the product information 26 via product identifiers. For example, dill sauce may be displayed 40 times and may be selected for printing 20 of the 40 times. Horseradish sauce may be displayed to customers 40 times and may be selected for printing 10 of the 40 times. In such as case, the information retrieval module 38 may be configured to identify a related information profile 27 including a discount coupon for dill sauce to be displayed to the customer as a selectable item to the customer over a discount coupon for horseradish sauce, as it has a better selection-to-display ratio.

Figure 3:
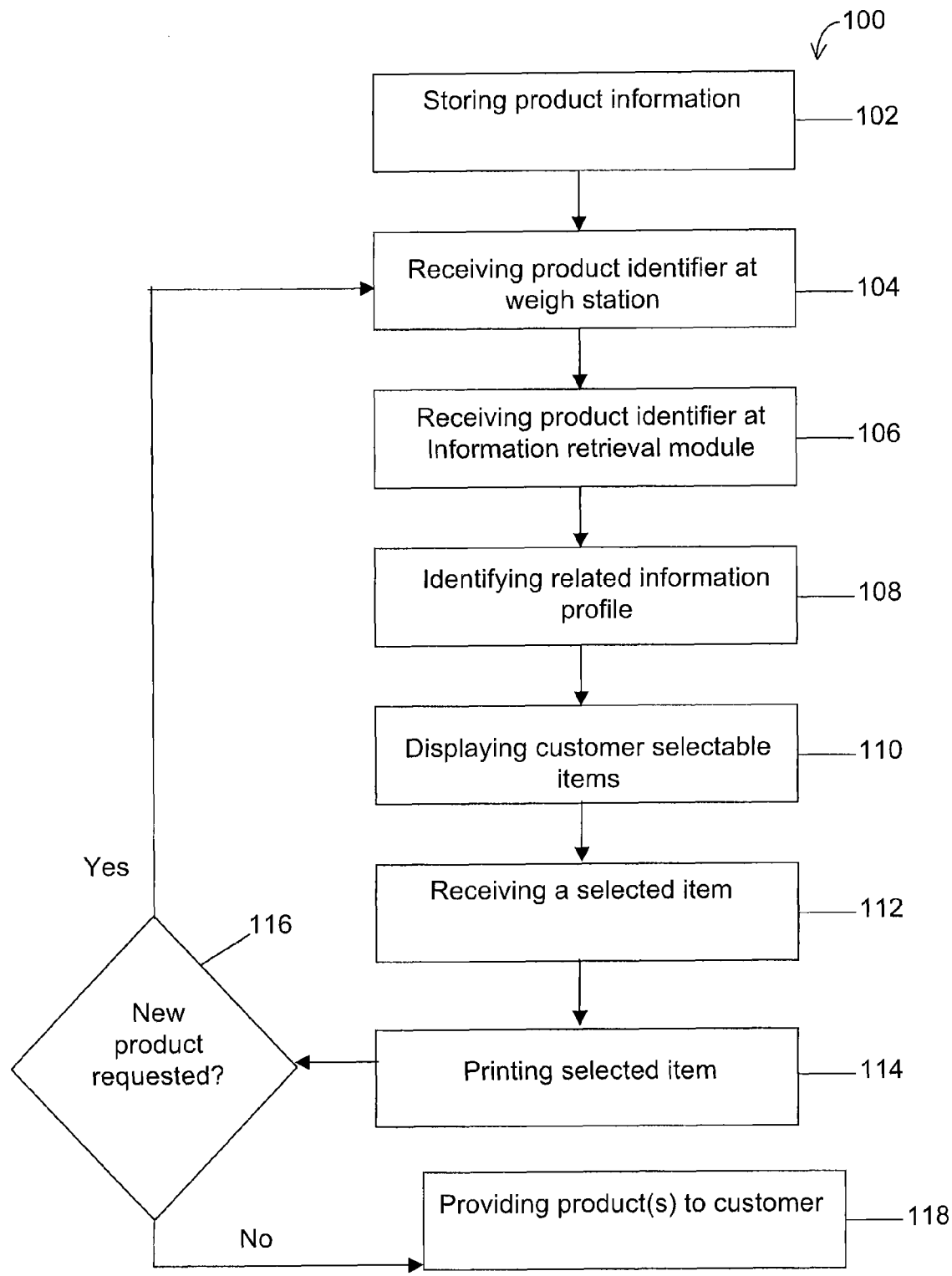
FIG. 3 shows a flowchart of a method for providing information to a customer in accordance with at least one embodiment.

Referring now to FIG. 3, there is shown a flowchart of a method 100 for providing information to a customer in accordance with at least one embodiment.

A customer arrives at the weigh station 2 and requests a product. For example, the customer may request three salmon steaks or 200 grams of smoked ham. Upon request, the operator prepares the product for the customer. This preparation may include slicing the smoked ham and placing it in a plastic bag. Or wrapping the salmon steaks in thin paper and then placing them in a plastic bag. In at least one embodiment, the customer may be at a self-service department and may prepare the product without the assistance of an operator.

At step 102, the storage module 24 linked to weigh station 2 stores product information 26 for a plurality of products. As above, the product information 26 may include related information profile(s) 27, cross-linking information 34, product record(s) 28, an inventory list of store products 36, corresponding store product location information 37, and any other suitable information that may be desirable to provide to the customer. The product information 26 may be stored in various forms and formats, and may be updating and added to by e.g. a professional service person or retail personnel.

At step 104, the weigh station 2 receives a product identifier corresponding to the requested product. An operator may enter a product identifier associated with the requested product into the input module 14 of the weigh station 2 in order to weigh the product and determine a price for the amount of the product requested. For example, the operator may weigh the smoked ham to determine the price for prepared ham slices weighing in at 200 grams, where it is sold at $1.69 per 100 grams.

In some embodiments an operator may not be involved such as e.g. a self-service weigh station department. The customer may prepare their own requested product and, at step 104, the customer can enter the product identifier associated with the requested product into the input module 14 of the weigh station 2.

At step 106, the information retrieval module 38 may receive the product identifier from the input module 14 of the weigh station 2.

At step 108, the information retrieval module 38 identifies a related information profile 27 from the product information 26 based on the product identifier. The related information profile 27 may include various items as described above. Examples include discount coupons 54, where each discount coupon indicates a discount on an associated discount coupon product, recipes 56 where each recipe typically involves a list of products, and meal plans 58 that involve the requested product.

The information retrieval module 38 may identify the related information profile 27 employing various methodologies, as described herein.

For example, the information retrieval module 38 may identify the related information profile 27 using the product record 28 and cross-linking information 34.

The information retrieval module 38 may also identify a related information profile 27 using the print information 42 and display information 44, such as by considering the selection-to-display ratio associated with customer selectable items 52, a component of the related information profile 27, as explained herein. These may be linked (directly or indirectly) to the product identifier and thus capable of being identified by the information retrieval module 38 using the product identifier.

The information retrieval module 38 may conduct a search or a pre-search of the database 6 in order to identify the related information profile 27. The pre-search results may be stored in the database 6 and/or a working memory (not shown) on the weigh station 2. Details will be described herein in relation to FIGS. 17 and 18. Other means of identification include retrieval, a look up table, or other suitable means known in the relevant art.

At steps 110 and 112, an interactive weigh station session may be established between the customer and an interactive customer display including a customer operated input module.

At step 110, the interactive customer display 16 may display visual information 50 based on the related information profile 27 which may include a plurality of customer-selectable items 52.

Figure 9:
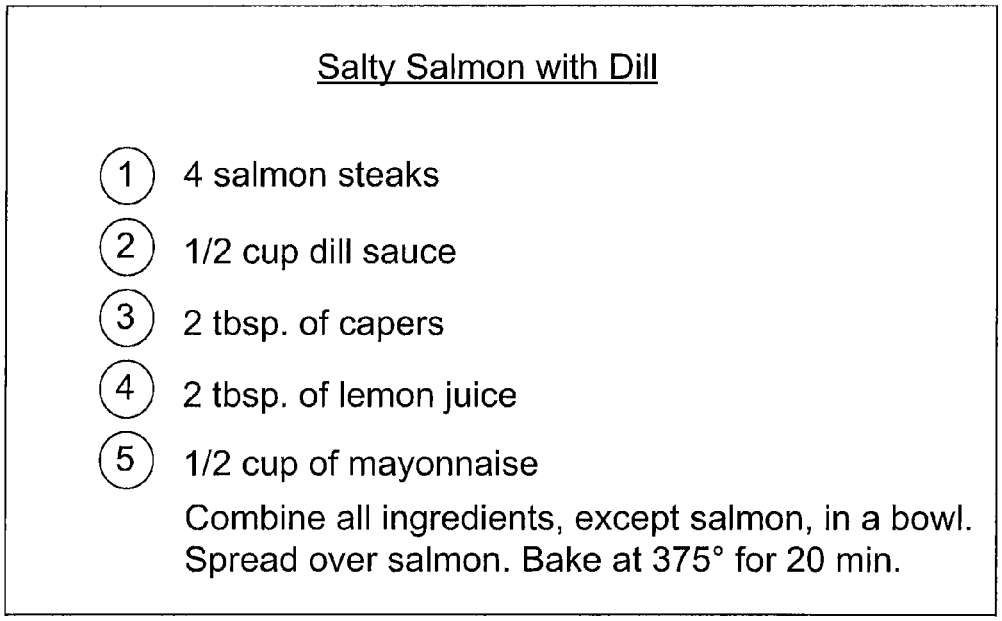
FIG. 9 shows a schematic diagram of an interactive customer display for displaying visual information including a recipe to a customer in accordance with at least one embodiment.
Figure 10:
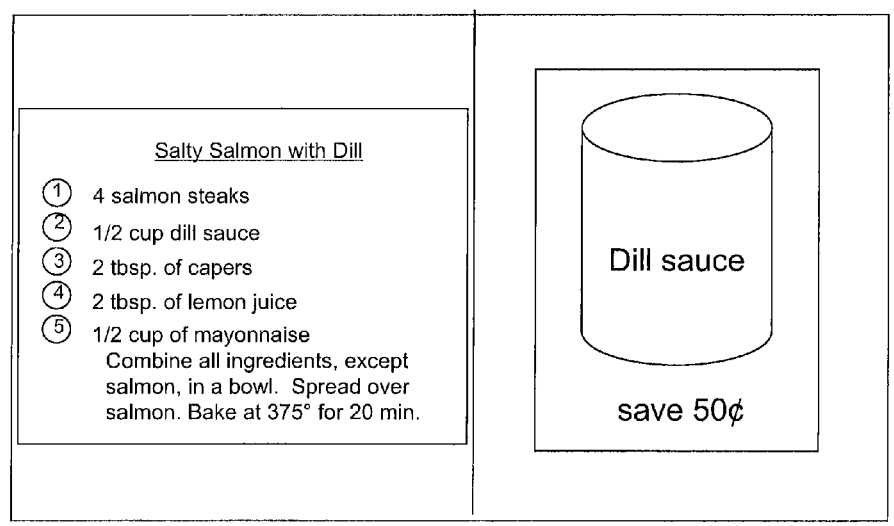
FIG. 10 shows a schematic diagram of an interactive customer display for displaying visual information including a recipe and a discount coupon to a customer in accordance with at least one embodiment.
Figure 11:
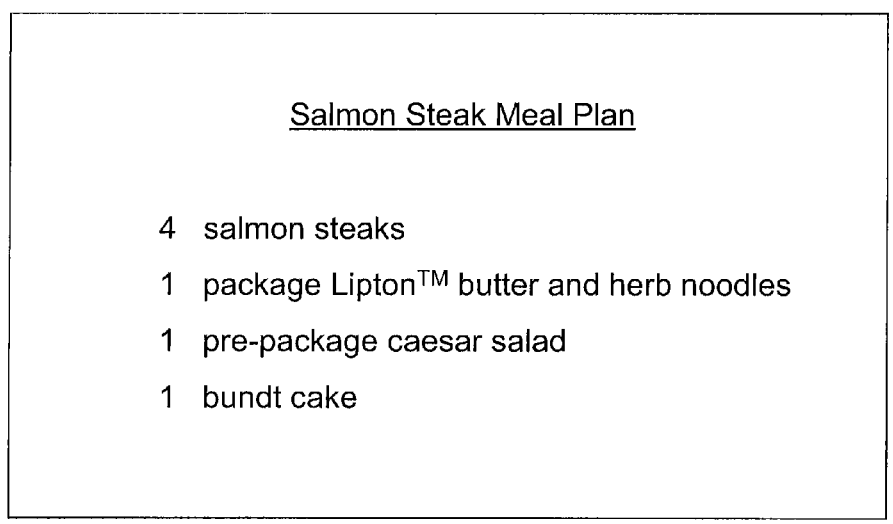
FIG. 11 shows a schematic diagram of an interactive customer display for displaying visual information including a meal plan to a customer in accordance with at least one embodiment.

Visual information 50 may include visual discount coupon(s) (FIG. 8), visual recipe(s) (FIG. 9) or a combination of both (FIG. 10).

The visual information may include customer-selectable items 52 which may identify a plurality of discount products linked to the discount coupon(s) 54. Customer-selectable items 52 may also identify one or more recipes from the plurality of recipes 56 wherein each recipe lists the requested product as an ingredient.

In at least one embodiment, the visual information 50 may identify a discount on the product, where the discount is contingent on a purchase of a second product. In such a case, the method 100 may further involve a step of transmitting a discount code readable by the point of sale station 60 via scanner 62. The discount code may indicate the discount, the requested product and the second product. The discount code may be used by the price calculation module 64 when determining the price.

Figure 8:
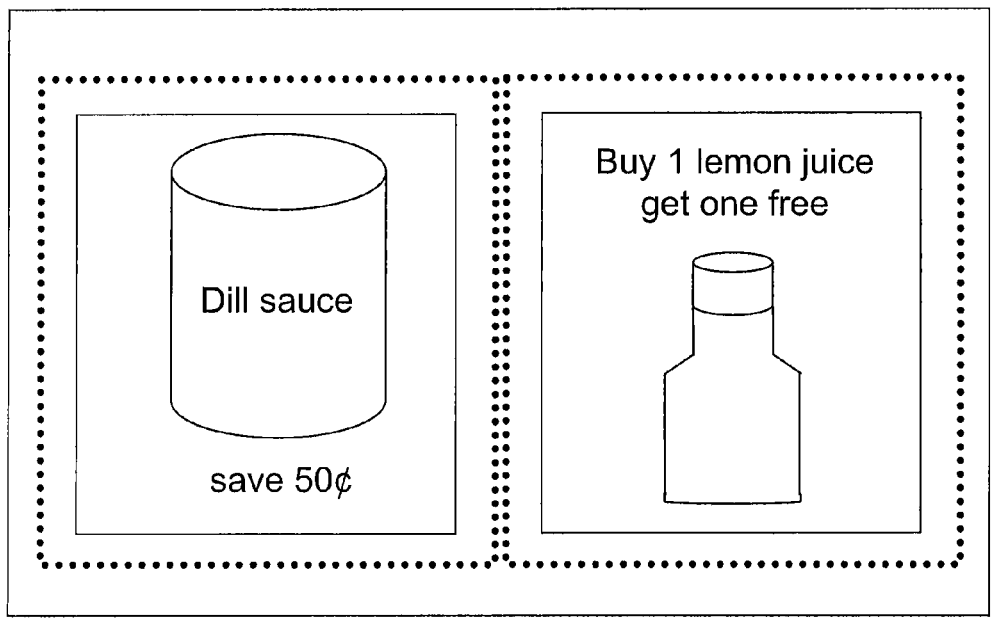
FIG. 8 shows a schematic diagram of an interactive customer display for displaying visual information including discount coupons to a customer in accordance with at least one embodiment.

The visual information 50 may include rendering data on how the related information profile 27 should be displayed or printed. For example, an identified related information profile 27 including a discount coupon 54 may contain visual information data indicating how the discount coupon 54 should be displayed to the customer on the interactive customer display 16, such as displaying the discount coupon 54 as a virtual discount coupon image containing the associated discount information and a picture of the discount product, as shown in FIG. 8.

The visual information 50 may further include data relating to how customer-selectable items 52 may be displayed as being selectable by the interactive customer display 16. For example, a customer-selectable item 52 may be illustrated with a colored outline (not shown), shaded, or otherwise highlighted for the customer on the interactive customer display 16.

At step 112, the interactive customer display 16 may receive a selected item from the customer via the customer operated input module 18.

In at least one embodiment, the selected item may be used by the information retrieval module 38 to identify an additional related information profile from the product information based on the selected item. The method 100 may return to step 110 where the interactive customer display 16 refreshes to display visual information 50 based on the additional related information profile. The visual information 50 may include customer selectable items 52 based on the additional related information profile. The method 100 may include refreshing the related information profile to display visual information 50 based on the additional related information profile.

At step 114, the customer printer module 8 may print a customer-selected print item based on the customer-selectable item 52 selected by the customer. The customer printer module 8 may receive the related information profile 27, or portions thereof, in order to print the customer-selected print item. The customer printer module 8 may use the visual information 50 for printing purposes as it may contain relevant printing data. The customer-selected print item may be printed in a different visual format than the display format.

The customer-selectable items 52 may identify a plurality of discount products. If the selected item relates to the discount product, the customer-selected print item may include a discount coupon.

The customer-selectable items 52 may identify a plurality of recipes. Each recipe may list the product as an ingredient. If the selected item relates to one or more of the recipes, then the customer-selected print item may include the recipe(s). The customer-selected print item may include a discount coupon for an ingredient product listed in the recipe identified by the selected item. The ingredient product may be different from the product.

In at least one embodiment, when the customer selected print item is printed, the information retrieval module 38 may be operable to refresh the interactive customer display 16 to display a second plurality of customer-selectable items 52 based on the product and the customer selected print item. The information retrieval module 38 may identify a second related information profile 27 in the product information 26 (and return to step 108) in order to refresh the interactive customer display 16 to display the second plurality of customer-selectable items 52 (step 110). Or, the information retrieval module 38 may use the first related information profile 27. Alternatively, the interactive customer display 16 may be operable to refresh to display the second plurality of customer-selectable items 52 without using the information retrieval module 38. The customer-operated input module 18 may be operable by the customer to select a second selected item from the second plurality of customer-selectable items. The customer printer module 8 may be operable to print a second customer selected print item based on the second selected item.

The system 1 may also include a disabling module 23 (shown in FIG. 1), as described above to limit the number of customer-selected print items. This feature may be implemented in various ways. For example, an error message may be displayed on the interactive customer display 16 or the customer-selectable item(s) 52 may not be displayed as a customer-selectable item 52 (e.g. not highlighted, different colour). The interactive customer display 16 may refresh and remove the corresponding customer-selectable item from the interactive customer display 16 (i.e. re-display all customer-selectable items 52 except the customer-selectable items 52 that corresponds to the previously selected item).

At step 116, the customer may request a new product. If so, the method 100 returns to step 104 and is repeated. Otherwise, the products prepared by e.g. the operator may be provided to the customer at step 118.

Figure 4:
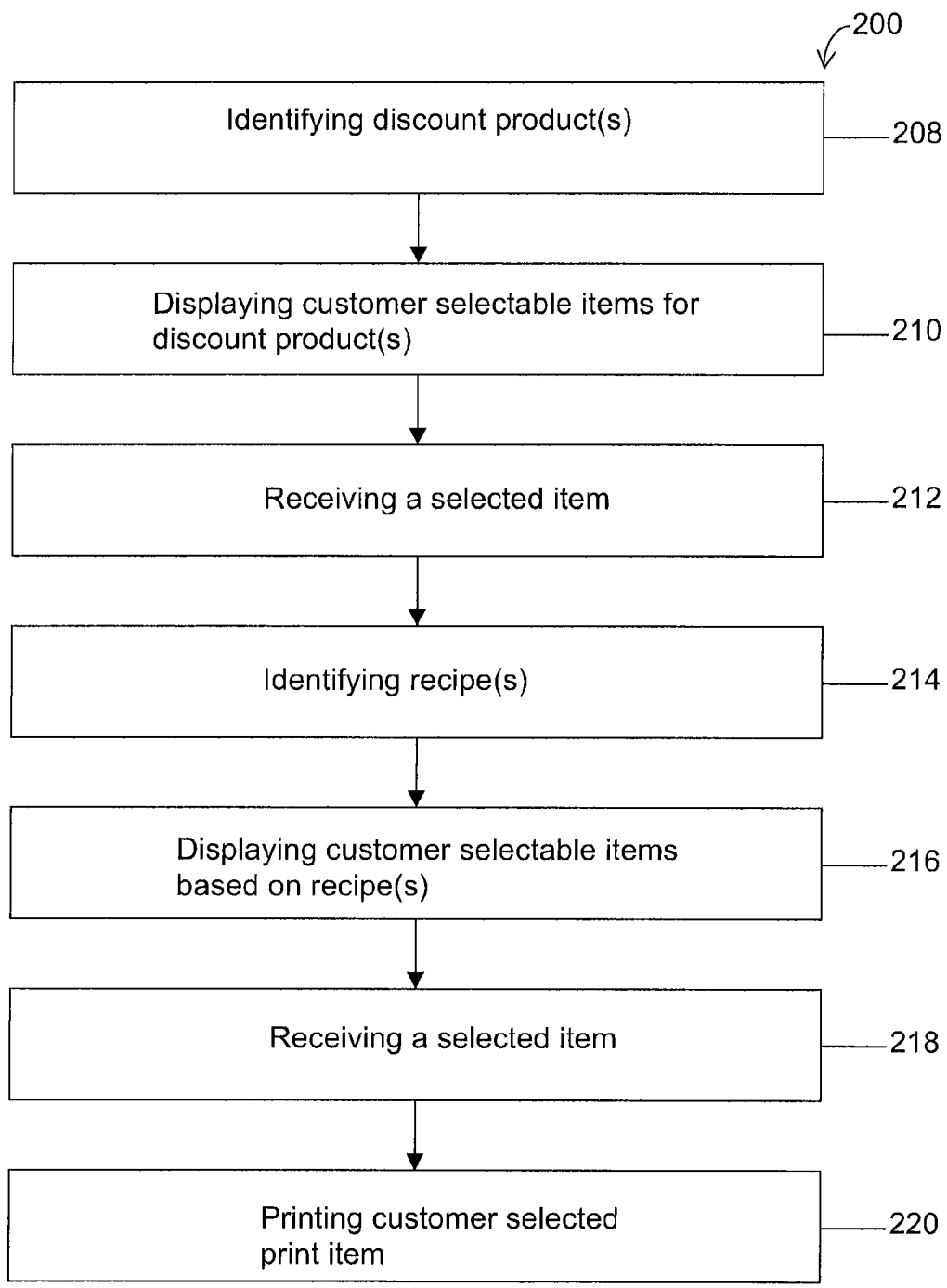
FIG. 4 shows a flowchart of a method for providing information including one or more discount coupons to a customer in accordance with at least one embodiment.

Referring now to FIG. 4, there is shown a flowchart of an example method 200 for providing information including one or more discount coupons or products to a customer in accordance with at least one embodiment. Method 200 may be an example embodiment of method 100 of FIG. 3 after e.g. steps 102 to 106 have been carried out.

At step 208, the information retrieval module 38 may identify one or more discount products and/or discount coupons 54 in the product information 26 using the product identifier.

In one example, the information retrieval module 38 may identify a product record 28 linked to the requested product via the product identifier in order to identify discount products and/or discount coupons 54. The product record 28 may link the product to the discount products and/or discount coupons 54.

In another example, the information retrieval module 38 may identify cross linking information 34 linked to the requested product via the product identifier in order to identify discount products and/or discount coupons 54. The cross linking information 34 may link the product to the discount products and/or discount coupons 54.

Both the product cross-linking information 34 and product record 28 may be established by the information retrieval module 38 using a search or pre-search of the product information 26, as will be discussed in more detail below in relation to FIGS. 17 and 18.

In another example, the information retrieval module 38 may identify the discount products and/or discount coupons 54 using print information 42 and display information 44 as determined and recorded by the customer selection module 40. The print information 42 and display information 44 can be linked to the requested product via the product identifier. As an example, the information retrieval module 38 may use the display information 44 to identify one discount product and/or discount coupon having a predetermined high selection-to-display ratio, as explained above.

At step 210, the interactive customer display 16 may display the identified discount products and/or discount coupons 54 to customer as customer selectable items 52, as generally described in relation to step 110 of FIG. 3. That is, the customer selectable items 52 may identify the discount products and/or discount coupons 54.

At step 212, the customer operated input module 18 of the interactive customer display 16 may receive a selected item from the customer. The selected item may identify one or more discount products and/or discount coupons 54. In at least one embodiment, if the selected item identifies a discount product the customer printer module 8 will print the selected item as a discount coupon for the discount product.

At step 214, the selected item identifying one or more discount products and/or discount coupons 54 can be used by the information retrieval module 38 to identify one or more recipe(s) 56 in the product information 26. That is, information retrieval module 38 may identify an additional related information profile (i.e. one or more recipes) from the product information 26 based on the selected item. The information retrieval module 38 can identify one or more recipe(s) 56 based on the selected discount coupon 54, its associated discount product, and the product identifier. Generally, the one or more recipe(s) 56 may involve the discount product and the requested product.

The information retrieval module 38 can identify one or more recipe(s) 56 employing various methodologies.

For example, the discount product and/or discount coupon 54 identified by the selected item may be linked to a default recipe in the recipes 54. This feature may be implemented using the product record 28 and/or cross-linking information 34, which may link the discount product and/or discount coupon 54 to the default recipe.

As another example, the information retrieval module 38 can be operable identify one or more recipe(s) at step 214 of FIG. 4 using a priority sequence code.

Figure 6:
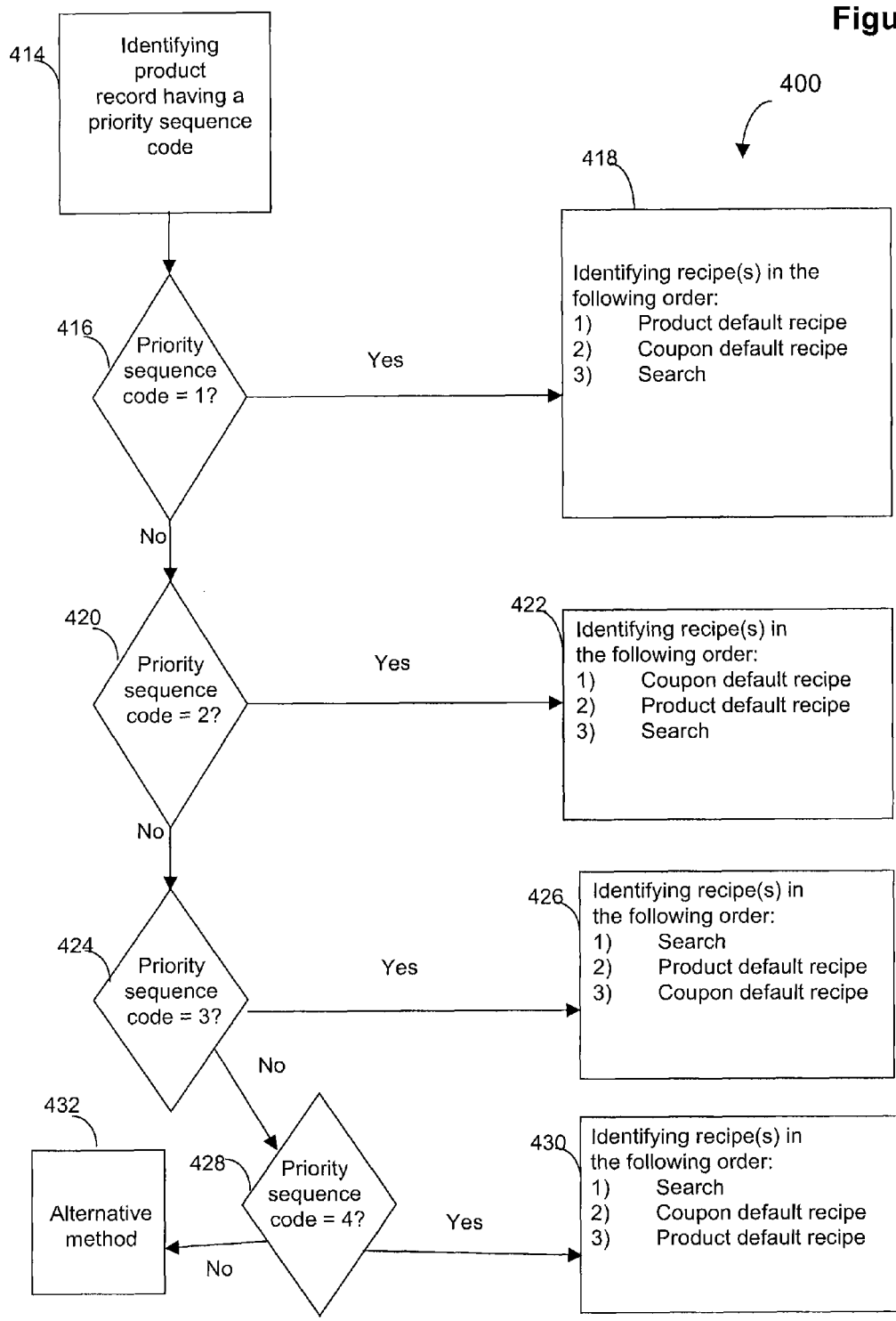
FIG. 6 shows a flowchart of a method for identifying one or more recipes using a priority sequence code in accordance with at least one embodiment.

Referring to FIG. 6, there is shown a flowchart of a method 300 for identifying one or more recipes using a priority sequence code in accordance with at least one embodiment.

At step 414, the information retrieval module 38 may identify a product record 28 associated with the requested product using the product identifier. The product record 28 for the requested product may contain a priority sequence code which may be identified by the information retrieval module 38. The product record 28 may further contain a default recipe (herein referred to as the product default recipe) and Moreover, the discount product and/or discount coupon 54 identified by the selected item (step 212 of FIG. 4) may be linked to a default recipe (herein referred to as the discount coupon default recipe).

The priority sequence code may correspond to a priority sequence that provides a sequence of methods for identifying one or more recipes 56. If no recipes 56 are identified by a method at a given step in the sequence, then the priority sequence proceeds to the next method and attempts to identify a recipe using that method.

For example, a method in the priority sequence may indicate that one or more recipe(s) should be identified via a search in the recipe collection. An example search employing a ranking system will be described in relation to FIG. 7.

If no recipes are identified by a search then the priority sequence proceeds to the next method, which may be identifying the product default recipe, as provided by the product record 28.

If the product record 28 does not contain a product default recipe, then the priority sequence may proceed to the next method, which may be identifying the discount coupon default recipe. For illustrative purposes, assume that at least one recipe 56 will be identified using one of the above methods. In the event that no recipe can be identified, then any recipes from recipes 56 stored in the product information 26 may be identified.

Four examples of priority sequences codes (i.e. (1)-(4)) corresponding to four priority sequences of methods for recipe identification are as follows:

(1) (a) product default recipe (b) discount coupon default recipe (c) search;

(2) (a) discount coupon default recipe (b) product default recipe (c) search;

(3) (a) search (b) product default recipe (c) discount coupon default recipe;

(4) (a) search (b) discount coupon default recipe (c) product default recipe.

While only four priority sequences involving only three methods of retrieval are shown above, other variations and methods may be used.

At step 416, the information retrieval module 38 determines whether the priority sequence code is 1. If so, then at step 418 the information retrieval module 38 may identify recipes according to the sequence of methods described above in relation to priority sequence code 1.

For example, the information retrieval module 38 can be configured to determine whether the product record 28 contains a product default recipe. If so, then the priority sequence may end there and the information retrieval module 38 identifies the product default recipe. If not, then the information retrieval module 38 performs the next method, specifically, identifying a discount coupon default recipe.

If there is a discount coupon default recipe, then the information retrieval module 38 can identify the discount coupon default recipe, and the priority sequence may end there. If not, then the information retrieval module 38 performs the next method, specifically, searching for one or more recipes in the recipes 54.

If the priority sequence code is not 1, then at step 420, the information retrieval module 38 determines whether the priority sequence code is 2. If so, then at step 422 the information retrieval module 38 identifies recipes according to the sequence of methods described above in relation to priority sequence code 2.

If the priority sequence code is not 2, then at step 424, the information retrieval module 38 determines whether the priority sequence code is 3. If so, then at step 426 the information retrieval module 38 identifies recipes according to the sequence of methods described above in relation to priority sequence code 3.

If the priority sequence code is not 3, then at step 428, the information retrieval module 38 determines whether the priority sequence code is 4. If so, then at step 430 the information retrieval module 38 identifies recipes according to the sequence of methods described above in relation to priority sequence code 4.

Otherwise, at step 432, the information retrieval module 38 may use an alternative recipe identification method. For example, any one or more recipes from the recipes 56 stored in the product information 26 may be identified by the information retrieval module 38. The method 400 may end after any of steps 418, 422, 426, 430, and 432, and the method 200 of FIG. 4 will proceed to step 216.

As another example, the information retrieval module 38 can be operable to search the recipes 54 to identify one or more recipe(s) at step 214 of FIG. 4. The search may be conducted in real-time or as a pre-search, where the results of the pre-search are linked to the product identifier and stored in the database 6 for later retrieval.

Figure 7:
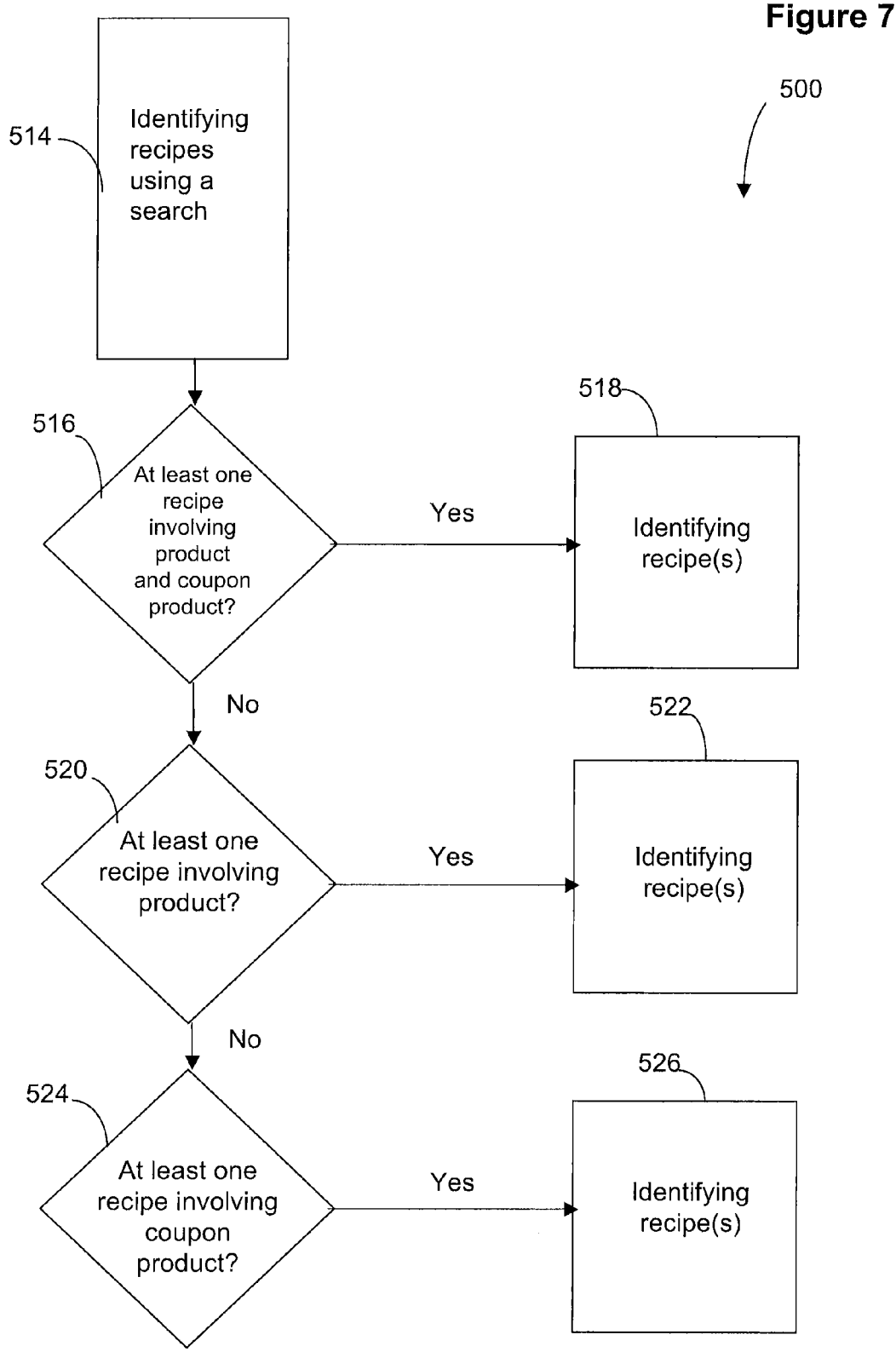
FIG. 7 shows a flowchart of a method for identifying one or more recipes using a search in accordance with at least one embodiment.

Referring now to FIG. 7, there is shown a flowchart of a method 400 for identifying one or more recipes using a search in accordance with at least one embodiment. The method 500 may be performed in order to identify recipes at e.g. step 108 of FIG. 3, step 214 of FIG. 4, or step 308 of FIG. 5.

The method 500 may employ a search involving a ranking system based the requested product and the discount product identified by the selected item. If the selected item identifies a discount coupon, the information retrieval module 18 may be operable to associate the discount coupon with the corresponding discount product.

Generally, the ranking system ranks one or more recipe(s) involving both the requested product and the discount product higher than recipe(s) involving only the requested product, which in turn rank higher than recipe(s) involving only the discount product.

At step 514, the information retrieval module 38 determines that identification of one or more recipes from recipes 56 can be based on the search employing the ranking system.

At step 516, the information retrieval module 38 determines whether the recipes 56 contains one or more recipes involving both the requested product and the discount product.

If one or more such recipe(s) 56 exist, then the method can proceed to step 518, and the information retrieval module 38 may identify those one or more recipes from recipes 56. The method 500 may end, and, for example, the method 200 of FIG. 4 may proceed to step 216. Alternatively, the method 500 may proceed to step 520 and the information retrieval module 38 may attempt to identify additional recipes.

The search of recipes 56 at step 516 (as well as steps 520 and step 524) may be any suitable search known in the art. For example, the search may be a keyword search such as e.g. a ranked keyword search or the search used by e.g. the Google™ search engine. For example, the product identifier may be linked to a product description that includes a product name (e.g. ham), an adjective (e.g. smoked) and a manufacturer/brand (e.g. Maple Leaf). The discount product may also contain a similar product description. As explained below in relation to FIG. 17, the keyword search may use the product name, and may also use adjectives or brands used to in the product description for the product and discount product. Moreover, the keyword search may use synonyms or predetermined substitutions for the product name such as "tuna" for the product name "salmon", as described below. Further, the keyword search may use truncations of the keywords or product names.

At step 520, the information retrieval module 38 may search the recipes 56 for one or more recipe(s) involving the requested product. If one or more such recipe(s) exist, then at step 522, information retrieval module 38 may identify those one or more recipes from the recipe(s) 56. The method 500 may end, and the method 200 of FIG. 4 will proceed to step 216. Alternatively, the method 500 may proceed to step 522 and the information retrieval module 38 may attempt to identify additional recipes.

At step 524, the information retrieval module 38 may search the recipes 56 for one or more recipe(s) involving the discount product. If one or more such recipe(s) exist then at step 526, the information retrieval module 38 may identify those one or more recipe(s). The method 500 may end, and the method 200 of FIG. 4 may proceed to step 216.

In at least one embodiment, if the production information 26 does not contain any of the above-described recipes, the information retrieval module 38 may identify any one or more recipes from the recipes 56 (not shown). Alternatively, the information retrieval module 38 may identify an additional discount product and/or discount coupon 54, or meal plan 58 or other customer-selectable items 52 from the related information profile 27.

Referring back to FIG. 4, the method 200 may proceed to step 216 after the information retrieval module 38 identifies one or more recipes from recipes 56 at step 214 according to any of the above-described methods. The one or more of the identified recipes may form part of an additional related information profile 27 identified by the information retrieval module 38.

At step 216, customer-selectable item(s) 52 based on one or more of the identified recipes may be displayed to the customer on the interactive customer display 16 in various display formats. More generally, the interactive customer display 16 may refresh to display visual information 50 based on an additional related information profile 27, namely the one or more of the identified recipes.

At step 218, the customer may use the customer operated input module 18 to select a selected item from then customer-selectable item(s) 52. That is, the customer operated input module 18 receives a second selected item.

Figure 14:
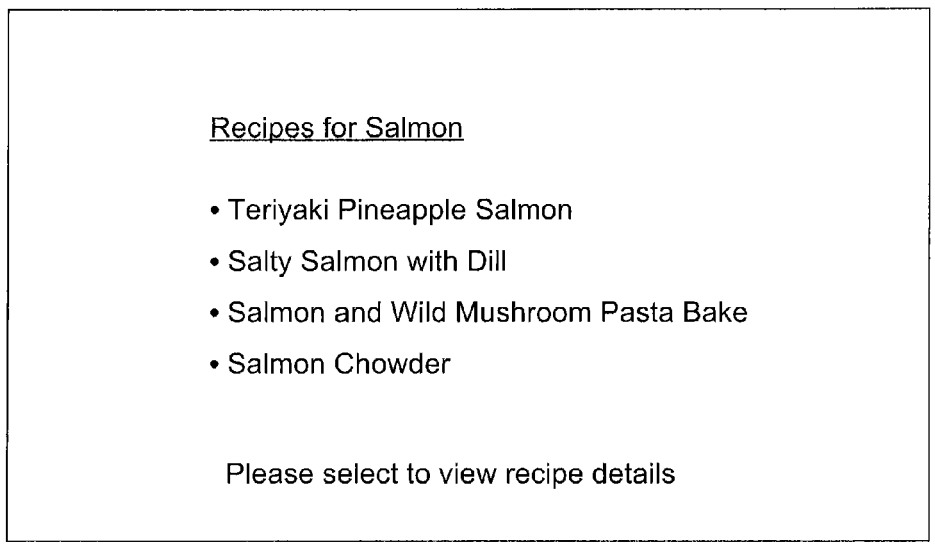
FIG. 14 shows a schematic diagram of an interactive customer display for displaying visual information including a list of recipes to a customer in accordance with at least one embodiment.

For example, referring now to FIG. 14, at step 216 the corresponding titles of the recipes may be displayed as customer-selectable item(s) 52, as e.g. a list of titles or thumbnail views (not shown). At step 218, a customer may select a recipe title (or thumbnail) using the customer-operated input module 18. Upon selection, the text of the selected recipe may be displayed as visual information 50 on interactive customer display 16.

As another example, referring to FIG. 4, the text of a recipe(s) may be displayed as a list of products (i.e. ingredients) along with preparation and cooking instructions. The list of products may be displayed as customer-selectable item(s) 52.

In at least one embodiment, one or more recipes involve a list of products, where each product can be associated with a product brand. When the text of recipe is displayed to the customer, then one or more products listed in the recipe may be denoted by brand. Referring now to FIG. 13 as an example, if a product listed in the recipe is mayonnaise and is associated with the product brand Hellmann's™, then the displayed recipe may list the product as Hellmann's™ mayonnaise. The one or more products listed in the recipe denoted by brand may be displayed as customer-selectable item(s) 52.

Figure 15:
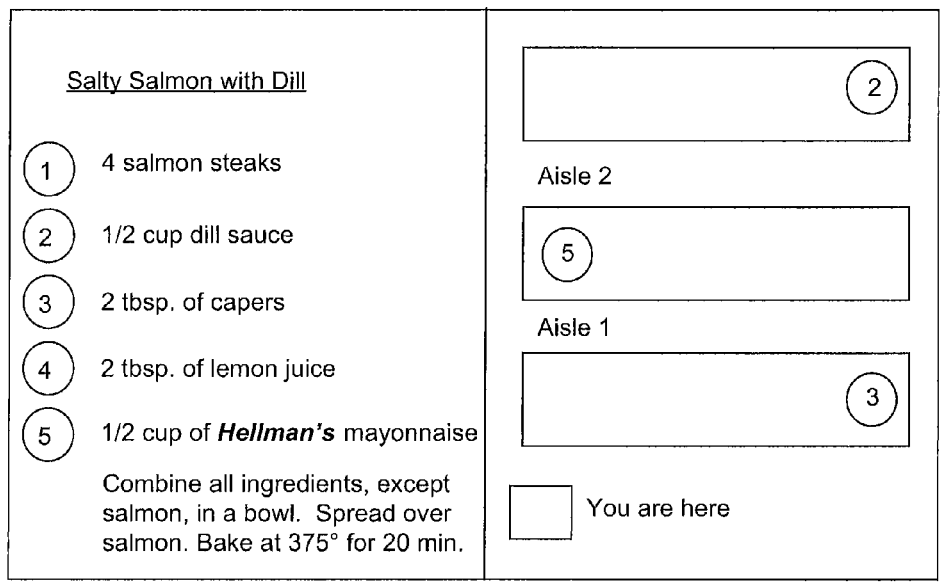
FIG. 15 shows a schematic diagram of a customer display for displaying visual information including a recipe listing a store product and its associated location in a store to a customer in accordance with at least one embodiment.

In at least one other embodiment, the product information 26 may include an inventory list of store products 36 and their corresponding store location information 37. The text of a recipe displayed on interactive customer display 16 may list one or more store products 36 as visual information 50. The visual information 50 may further include a visual indication of the location of the product in the store. Referring to FIG. 15 as an example, the store location information 37 may including a store map that may be displayed to the customer along with the recipe, wherein the location of the store products 36 are highlighted on the map.

For example, at step 216 the store location information 37 shown in FIG. 15 may be displayed on interactive customer display 16 as a customer-selectable item 52. At step 218, a customer may select the store location information 37 displayed on the interactive customer display 16.

At step 220, the customer printer module 8 can print a customer-selected print item based on the selected item. Using the above example, the customer-selected print item may contain the corresponding store location information 37 (i.e. a personalized store map) for use by the customer in locating the store products 36.

Although in steps 208 and 214 of FIG. 4 the related information profile 27 includes one or more discount products and recipes, respectively, the identified related information profile 27 may include other items including recipes, nutritional statements, meal plans, store maps, store product location information and the like. An additional example will now be described.

Figure 5:
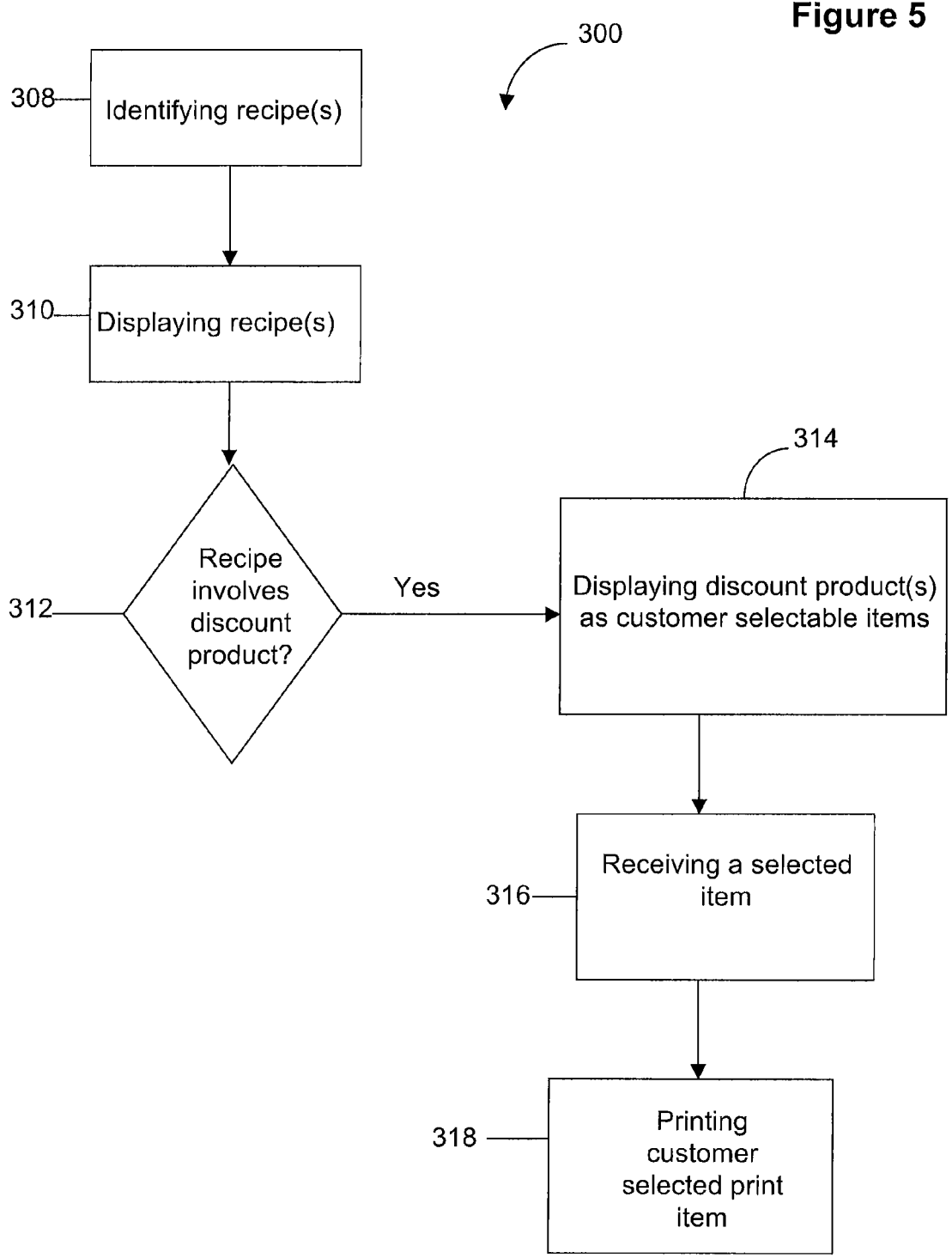
FIG. 5 shows a flowchart of a method for providing information including one or more recipes to a customer in accordance with at least one embodiment.

Referring now to FIG. 5, there is shown a flowchart of a method 300 for providing information including one or more recipes to a customer in accordance with at least one embodiment. Method 300 may be an example embodiment of method 100 of FIG. 3 after e.g. steps 102 to 106 have been carried out.

At step 308, the information retrieval module 38 may identify one or more recipes from the recipes 56 stored in the product information 26 based on the product identifier. The identification by the information retrieval module 38 may be via any method described herein, see e.g. step 214 of FIG. 4 and step 108 of FIG. 3. For example, the information retrieval module 38 may identify one or more recipes based on the product identifier using a look-up table, pre-determined product associations, cross-linking information 34, product records 28, search and pre-search results (e.g. FIG. 7), priority sequences, product name relationships, product brand relationships or any other information or database 6 relationship chosen by the system operator.

As another example, discount coupons 52 may be represented in the storage module 24 as a list of discount products. The information retrieval module 38 may be operable to identify the one or more recipes using both the product identifier and the list of discount products. A recipe is more likely to be identified if it involves both the product linked to the product identifier and a discount product on the list of discount products.

As a further example, the product information 26 may include an inventory list of store products 36 and their corresponding store product location information 27. The information retrieval module 38 may be operable to identify the one or more recipes using both the product identifier and the inventory list of store products 36. A recipe is more likely to be identified if it involves both the product linked to the product identifier and one or more store product(s) on the inventory list of store products 36. Further, a recipe may be more likely to be identified if it involves more store products than other recipes in the recipes 56.

As an even further example, the information retrieval module 38 may identify the one or more recipes using a combination of the list of discount products and the inventory list of store products 36, either sequentially or simultaneously.

For example, if one recipe 56 contains three discount products and four store products and a second recipe 56 contains one discount product and five store products, then the information retrieval module 38 may be operable to identify the first recipe over the second recipe. This feature may be implemented in various ways, such as via a weighting mechanism.

The information retrieval module 38 may identify a preliminary subset of one or more recipes using inventory list of store products 36 as a first weighting factor and in the event of a tie, use in the list of discount products.

At step 310, the one or more recipes identified at step 308 (or a smaller subset thereof may be displayed to the customer on the interactive customer display 16. The recipe(s) may be displayed in numerous ways, such as is described in relation to step 216 of FIG. 4. For example, the recipe(s) may be displayed to the customer on the interactive customer display 16 as a list of products (i.e. ingredients).

At step 312, the information retrieval module 38 can determine whether the recipe 56 involves one or more products that are discount products. As above, discount coupons 54 may be represented in the storage module 24 as a list of discount products, where a corresponding discount coupon 54 may be available for each discount product. Upon identifying a recipe, the information retrieval module 38 can be operable to identify which ingredients in the recipe are also discount products.

If so, then at step 314, the discount product listed in the recipe can be displayed as a customer-selectable item 52 on interactive customer display 16 for selection by the customer using the customer-operated input module 18.

Referring now to FIG. 16, there is shown a schematic diagram of a customer display for displaying visual information including a recipe listing a discount product to a customer in accordance with at least one embodiment. The recipe text explicitly alerts the customer that a discount coupon 54 may be available and the discount product can be displayed as a customer-selectable item 52.

Referring now to FIG. 10, a display of the discount coupon 54 associated with the discount product may also be displayed on the interactive customer display 16 alongside the recipe text, where visual information identify the discount product and corresponding discount coupon 54 may be selectable by the customer, for e.g. printing.

Referring back to FIG. 5, at step 316, the customer may select a selected item using the customer-operated input module 18. The selected item may identify the discount product explicitly, or implicitly as a recipe listing the discount product.

At step 318, the customer printer module 8 can print a customer-selected print item based on the selected item identifying the discount product. The customer-selected print item may include a discount coupon 54 corresponding to the discount product for use by the customer. The customer-selected print item may include a discount code for specifying the associated discount, readable by the point of sale station 60.

Figure 17:
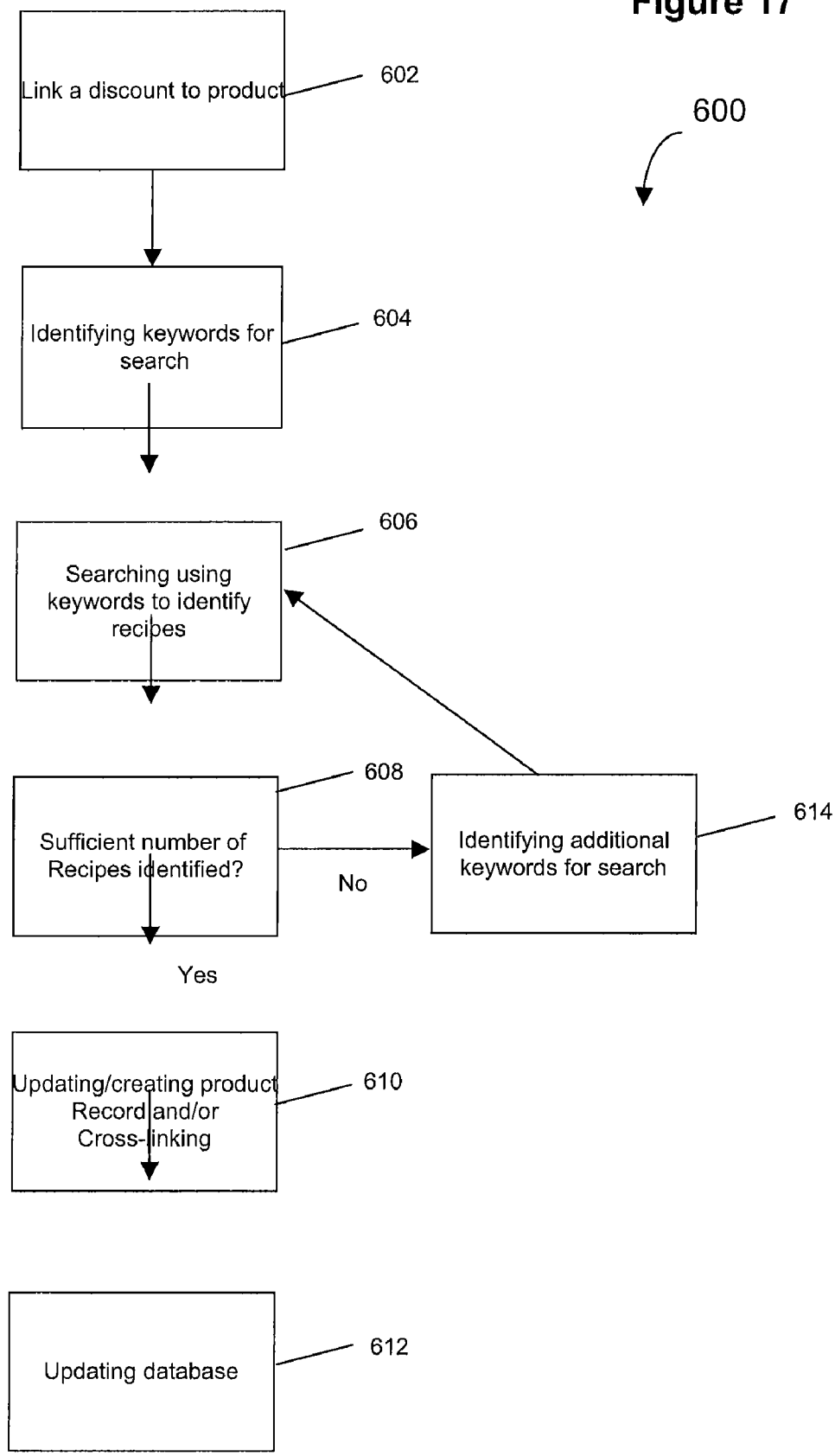
FIG. 17 shows a flowchart of a method for establishing product cross-linking and/or a product record in accordance with at least one embodiment.

Referring now to FIG. 17, there is shown a flowchart of a method 600 for establishing cross-linking information 34 or a product record 28 in accordance with at least one embodiment. As above, the information retrieval module 38 may identify a related information profile 27 based on the product identifier (see e.g. step 108 of FIG. 3). The identification may be implemented in various ways such as e.g. using cross-linking information 34 and/or a product record 28 as stored in the product information 26.

The cross-linking information 34 and product record 28 may be established for one or more products listed in the product information 26, and linked thereto via the respective product identifier in accordance with method 600. Establishing may include creating and/or updating cross-linking information 34 and product record(s) 28.

The steps of method 600 may be implemented on an external processor (not shown) on server 4 linked to either database 6 or an external database (not shown) containing a copy of the product information 26. The established cross-linking information 34 or product record 28 may be sent and downloaded to the database 6.

Database 6 may be an internal component of the weigh station 2 and may not contain all the product information 26 shown in the storage module 24, such as the recipes 56 or discount coupons 54. This may reduce the amount of memory required by database 6, which may be advantageous if the database 6 is located within the weigh station 2, which may have limited memory. Therefore if computationally intensive processing may be required in order to create a large number of product records 28 and/or cross-linking 34, it may be executed by server 4 with sufficient processing power linked to weigh station 2 and database 6, and then downloaded to the weigh station 2 and database 6, as conventional clients and servers.

Establishing cross-linking information 34 and product record 28 may also be referred to herein as a pre-search in order to create the cross-linking information 34 and product records 28. When a pre-search is performed the results may be stored in the product information 26 and the information retrieval module 38 may not required to conduct a real-time search in order to identify a related information profile 27.

At step 602, the product via the product identifier may be linked to a discount coupon 54 associated with a discount product. This may be achieved by e.g. incorporating the discount coupon 54 (or a link to the discount coupon) in the product record 28 or cross-linking information 34. If a product record 28 or cross-linking 34 does not exist for the product identifier, then a new product record 28 or cross-linking information 34 may be created so that the link to a discount coupon 54 may be recorded therein. This link may be established manually by a professional service person or dynamically by the system 1 whenever a new discount coupon 54 may be available or a change in discount coupons 54 linked to the product identifier may be desired. The link established between the product identifier and the discount coupon 54 may represent various relationships between the discount product and the product identifier. For example, the discount product may be a competitive product or a complementary product, as described above.

Referring now to FIG. 18, there is shown a block diagram of an example product record 28 and cross-linking information 34 in accordance with at least one embodiment. Both the cross-linking information 34 and the product record 28 may link to the product identifier, as well as to discount coupons.

For example, the product record 28 may link to a product via the product identifier and stores a link to discount coupon 1, discount coupon 2, discount coupon 3, and alternatively a default discount coupon. It will be appreciated that the product may link to a default discount coupon alone, or only one of discount coupon 1, discount coupon 2, or discount coupon 3. Similarly, cross-linking information 34 may link to the product via the product identifier, and stores the link to discount coupon 1 and discount coupon 2.

The product record 28 and cross-linking information 34 may also link the discount coupons 54 to recipes 56. The information retrieval module 38 may identify recipes 56 via a search.

At step 604, for the search for recipes 56, keywords associated with the discount product and the product linked to the product identifier may be identified. These keywords may then be used to conduct any suitable keywords search on a database 6 or storage module 24 containing the recipes 56. For example, the keywords may be used to generate an SQL query. A description of the product may be stored in a database (either database 6 or another database) and linked to the product identifier. For example, the description of the product may be Maple Leaf™ smoked salmon. When conducting a key word search it may be desirable to use only name of the product. Adjectives that describe the product or the name of the product manufacturer (or brand) may also be used. The description of the product may contain the name of the product and adjectives and it may be necessary to identify only those words in the description that relate to the product name or that will be used for the keyword search.

For example, the product name may be salmon, an adjective may be smoked and the manufacturer's name Maple Leaf™. The discount product may also have an associated description, such as dill sauce, where the product name is dill and the adjective is sauce. When conducting the search in some instances only the product name for both the product and the discount product will be relevant. Therefore at step 604 the product name associated with both the product and the discount product will be identified for use in a keyword search for recipes.

At step 606, a recipe search may be conducted using the keywords identified at step 604. The search may be conducted by information retrieval module 38 in a database 6. Alternatively the search may be conducted using an external processor (not shown) on server 4 connected to an external database (not shown). The external database may contain a copy of the product information 26, and specifically the recipes 56 (FIG. 2). A search of the recipes 56 using the keywords will identify any recipes 56 involving both the product and the discount product.

For example, a SQL query may be generated using the words "salmon" and "dill" in order to identify any recipes stored in the recipes 54 involving salmon or dill. If any recipes 56 are identified in the search either the recipe 56 itself or a link to the recipe 56 (i.e. a reference code associated with the recipe) may be identified so that it may be incorporated in the product record 28 or cross-linking information 34.

In at least one embodiment, the search using a ranking system described above in relation to FIG. 7 may be implemented at step 606 in order to identify recipes from the recipes 54.

At step 608, a determination as to whether a sufficient number of recipes 56 are identified may be made. There may be a minimum or maximum number of recipes 56 that should be identified for use in the product record 28 or cross-linking information 34. For example, a requirement may be that three recipes are linked to the discount coupon 54. The search result set returned at step 606 for a discount coupon 54 may be examined to determine whether it contains a sufficient number of recipes.

If a sufficient number of recipes 56 are identified, then at step 610, the product record 28 or cross-linking information 34 may be updated to include the recipes 56 identified in the search. If the product identifier is not linked to a product record 28 or cross-linking information 34 and one was not created at step 602, then alternatively a new product record 28 or cross-linking information 34 may be created and linked to the product identifier.

Referring back to FIG. 18, each discount coupon 54 included in the product record 28 may be linked to 3 recipes. That is, the sufficient number of recipes for each discount coupon 54 is three. For example, discount coupon 1 is linked to recipe A, recipe B and recipe C, which is a sufficient number of recipes 56. A link between discount coupon 1 and the recipe 56 set can then be recorded in the product record 28.

As such, each product record 28 may link the product identifier to multiple discount coupons 54, such as discount coupon 1, discount coupon 2 and discount coupon 3. Each discount coupon 54 may in turn link to their own recipe set (i.e. (recipe A, recipe B, recipe C), (recipe D, recipe E, recipe F), and (recipe G, recipe H, recipe 1) respectively).

Similarly, the cross-linking 34 for linking a product identifier to a discount coupon 54, may also in turn link the discount coupon 54 to a recipe set (recipe A, recipe B, recipe C), as shown in FIG. 18.

If a sufficient number of recipes are not identified, then at step 614 additional keywords may be identified for the search. For example, a list of synonyms or related terms may be linked to various product names, which are in turn linked to product identifiers. For example, "tuna" may be linked to "salmon" in the list of related terms. Moreover, "thyme" may be linked to "dill" in the list of related terms. Similarly, "fish" may be related to "salmon" in the list of related terms. If the discount product is dill sauce and the product is salmon, then one or both of the words "thyme", "tuna" and "fish" may be returned at step 614 to be used as additional keywords in a search for recipes.

Then the method 600 may return to step 606 in order to run a new search using the new keywords in an attempt to identify additional recipes 56. For example, the recipes 56 may not contain a recipe involving dill and salmon, but may contain three recipes 56 involving dill and tuna. As tuna is similar to salmon, the recipe for tuna and dill may be modified so as to substitute salmon for tuna. Moreover, the recipes 56 may not contain a recipe using salmon and dill, but may have a recipe 56 using salmon and thyme. In any event, new keywords and combinations may be used in the search at step 606 in order to identify a sufficient number of recipes 56.

If a sufficient number of recipes cannot be obtained, any recipe 56 may be identified in order to identify the number of recipes required at step 608.

At step 612, database 6 may be updated with the established product record 28 and/or cross-linking 34, to be used by the information retrieval module 38 for identifying a related information profile 27.

This may be performed by an external processor connected to database 6 via server 4 or locally by information retrieval module 38.

In at least one embodiment, a preferred manufacturer module (not shown) may be included in the database 6. The preferred manufacturer module may include a list of vendors, where each vendor has a rank or weight attached thereto. In such embodiments, when the information retrieval module 38 identifies or retrieves two or more customer-selectable items 52, for example discount coupons 54, each customer-selectable item 52 (i.e. the discount coupons 54) may be linked to a vendor. The information retrieval module 38 can identify the vendors(s) linked to each of the two or more customer-selectable items 52 and can provide the manufacturer names to the preferred manufacturer module in order to determine whether the vendor(s) are included on the list of vendors. If so, the preferred manufacturer module may return the rank or weight attached to the provided vendor(s) to the information retrieval module 38. The information retrieval module 38 can then determine which one of the vendors linked to the two or more customer-selectable items 52 has a the highest rank or weight, and can be configured such that it is more likely to identify a customer-selectable item 52 linked to the most preferred vendor (i.e. the vendor with the highest rank or weight). Alternatively, the information retrieval module 38 may provide the preferred manufacturer module with a group of vendors, and the preferred manufacturer module may determine which vendor of the group has the highest ranking, which it returns to the information retrieval module 38. It will be appreciated that various alternative configurations are contemplated to achieve the selection of a preferred vendor (or more) of a group of vendors linked to two or more discount coupons 54, i.e. what vendor has the highest ranking, and then identify/retrieve/return the discount coupon linked to such manufacturer.

In at least one other embodiment, the system 1 may include a display delay module (not shown) in order to ensure the customer has adequate time to select one or more customer selectable items displayed on interactive customer display 16 before they are no longer displayed. A timer, such as the timer of the timer module 22, can be linked to interactive customer display 16 and a delay factor can be stored in the memory of the weigh station 2, server 4 or database 6. When a customer selectable item 52 is displayed on the interactive customer display 16 the timer can be activated. If a new product identifier is entered into data input module 14 it may prompt new customer selectable items to be identified by information retrieval module 38 and displayed on interactive customer display 16 as explained above.

However, before refreshing the interactive customer display 16 to replace the previously displayed customer-selectable items 52 with the new customer-selectable items 52, the display delay feature may be implemented. Specifically when a new product identifier is entered into the input module 14 the timer can be inactivated and a display time can be determined using the timer. The display time may relate to how long the one or more customer selectable items were displayed on interactive customer display 16 before the new product identifier may be entered. Before the new visual information 50 may be displayed of the interactive customer display 16, the display delay module can compare the display time with the delay factor. If the display time is less than the delay factor, then the display delay module will delay the display of the new visual information 50 on the interactive customer display 16 for a length of time equal to the difference between the delay factor and display time. Otherwise, the new related information profile may be displayed on interactive customer display 16. For example, if the display time may be 30 seconds and the delay factor is 45 seconds then the display delay module may delay the display of the new related information profile for 15 seconds.

As described above, in at least one embodiment, system 1 may include a label printer 9 for printing a label item on an adhesive media. The label item may be attachable to the product. The system 1 includes a customer printer module 8 to print a customer selected print item on a non-adhesive media.

The system 1 may be configured such that a the information retrieval module 38 can query the database 6 and storage module 24 to identify a related information profile 27 based on the product identifier entered by a system operator. In response to the query, the database 6 can return the related information profile 27 that corresponds to the product identifier entered.

The related information profile 27 for a selected product (the product can be a store product or a discount product) may contain a plurality of product information and different portions of the related information profile 27 can be sent to the customer printer module 8 and the label printer 9. Both the customer printer module 8 and the label printer 9 can be located such that access to the customer printer module 8 and the label printer 9 may be restricted to the operator. Alternatively, the customer printer module 8 can be accessible by a customer. Data sent to the label printer 9 can be used to create an adhesive product label whereas data sent to the customer printer module 8 can be used to create a separate, customer-selected print item. The operator can identify the label item from the label printer 9, apply the adhesive label to the selected product, and then hand the labeled product to the customer.

As an example, assume a customer is desirous of purchasing salmon steaks from the deli department of a grocery store. In order to purchase salmon steaks from a deli department, a customer must request a desired number of salmon steaks from a display case. In response to the request from the customer, an operator may begin a customer session (as above) and can engage the system 1 by first entering a unique product identifier for salmon into the input module 14 of the weigh station 2. The product identifier may be entered into the input module 14 in any manner known in the art. To ensure that the system 1 has adequate time to identify and print the necessary information, an operator can be trained to enter the product identifier into the system 1 prior to physically preparing the requested product. Having entered the product identifier, the operator can then proceeds to identify and prepare the desired product. If salmon steaks are sold on a per weight basis the desired quantity of salmon can be weighed on the scale 10. If, however, salmon steaks are sold on a per unit basis, the operator can simply enter the desired quantity to be purchased into the system 1.

While the operator is gathering the requested product, the product identifier may be sent to the database 6 by the communication module 12 or by any communication connection between the input module 14 and the database 6 such as e.g. server 4. The information retrieval module 38 may then identify the related information profile 27 for salmon steaks for provision to the weigh station 2 and interactive customer display 16. The related information profile 27 for the salmon steaks can contain label information, including price per unit weight, as well as associated visual information 50, such as a recipes 56 or discount coupons 54 as described above. The communication module 12 may then route the label information to the label printer 9 for printing a label item on an adhesive media for attachment to the packaging of the salmon steaks by the operator. The label printer 9 may be a thermal printer or any other label printing system known in the art.

The visual information 50 can simultaneously be presented to the customer via the interactive customer display 16. When a customer selects a selected item, data relating to the selected item and/or the related information profile 27 may be routed to the customer printer module 8 for printing a customer-selected print item on a non-adhesive media. For example, the customer-selected print item could be a discount coupon 54 for dill sauce. As described in more detail above, the customer printer module 9 may be a thermal printer or it may be any other type of printer known in the art, including an ink-jet printer. The customer printer module 8 may also be capable of printing in colour to make the customer-selected print item more visually attractive.

In the example described above, the customer-selected print item may be a discount coupon for dill sauce, which may be a complementary product to the salmon steaks requested. The customer-selected print item could have alternatively been any other type of customer-selectable item 52 associated with salmon steaks and stored in the related information profile 27. The retailer, manufacturer/vendor, store manager or any other suitable party can determine which incentives are included within the product information 26 and the related information profile 27 for a given product in advance. For example, instead of a discount coupon 54 for the complementary product dill sauce, the related information profile 27 associated with salmon steaks could have included a discount coupon 54 for the salmon steaks themselves (redeemable on some future date), a discount coupon 54 for any other complementary product, a discount coupon 54 for a substitute product (such as tuna steaks), a discount coupon 54 for a competing brand of salmon steaks, a recipe 56 involving salmon steaks or any other type of promotional or incentive information.

Figure 19:
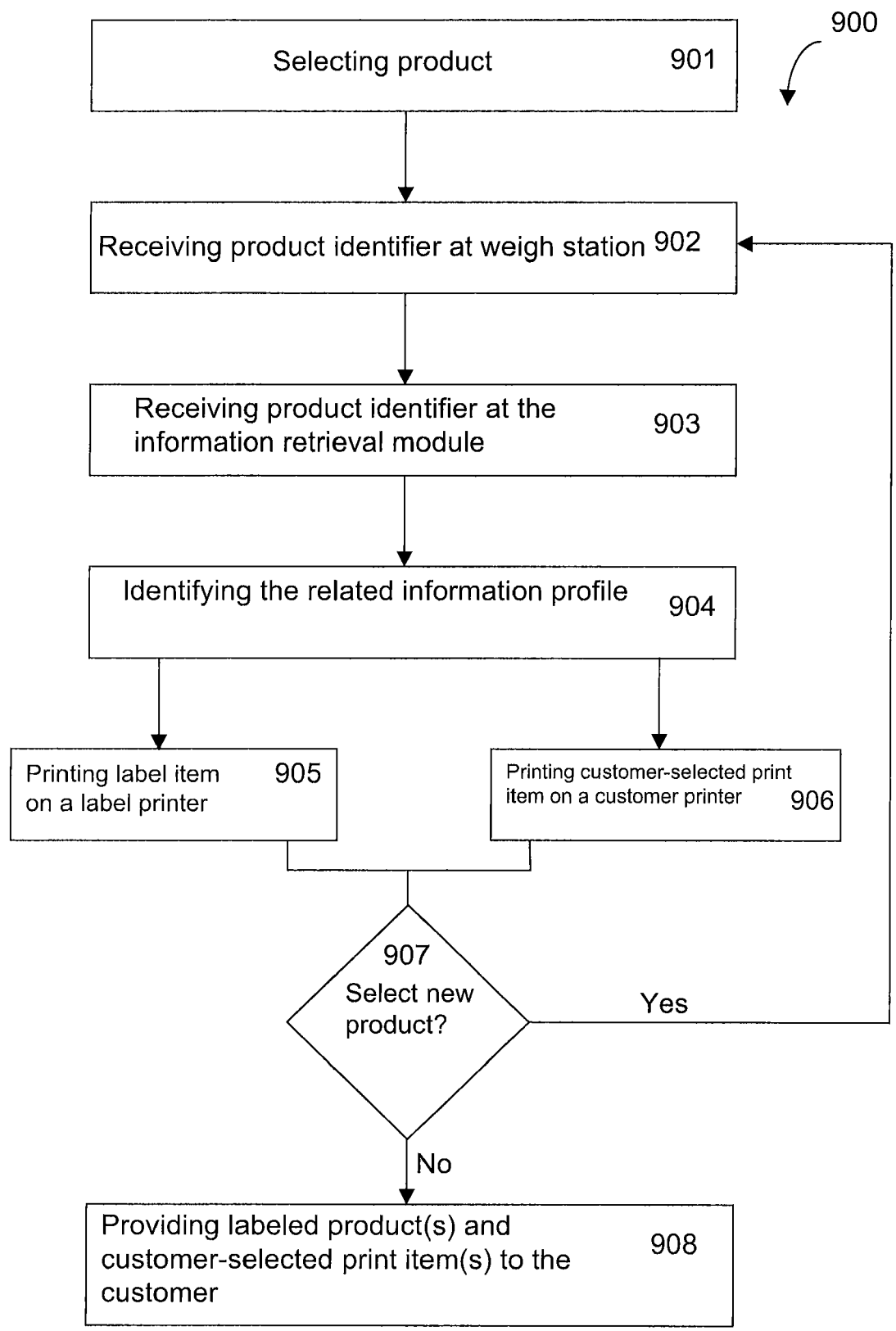
FIG. 19 shows a flowchart of a method for providing a label item and a customer-selected print item to a customer in accordance with at least one embodiment.

Referring to FIG. 19, there is shown a method 900 for providing a label item and a customer-selected print item to a customer in accordance with at least one embodiment.

At step 901, a customer may arrive at a service counter in a retail department with a weigh station 2 and may select a product.

At step 902, an operator may enter the product identifier for the selected product into the input module 14 of the weigh station 2 thereby engaging the system 1. After entering the product identifier, the operator prepares the requested product for the customer. Preparation of the requested product may include wrapping individual portions of items sold individually, or weighing quantities of products on the scale 10 if the product is sold by weight.

At step 903, the product identifier may be sent by the communication module 12 to the information retrieval module 38 of the database 6, via e.g. server 4.

At step 904, the information retrieval module 830 may identify the related information profile 27 associated with the requested product based on the product identifier. The related information profile 27 returned for a given product may include the necessary visual information 50 and any other associated information, as well as the required label information. Associated information may include a variety of predetermined information including customer-selectable items 52 that have been associated with the requested product, or customer-selectable items 52 for a different product based on the cross-linking information 34 or the product record 28 linked to the product identifier.

For example, if the requested product is salmon steaks, then the identified customer-selectable items 52 may be related to a complementary discount product, such as dill sauce, linked to the product via the product cross-linking information 34. Or, if the requested product is Maple Leaf™ smoked ham, then the identified customer-selectable items 52 may be related to a competitive discount product, such as Pillers'™ smoked ham.

At step 905, the label information 825 contained in the related information profile 27 may be routed to the label printer 9. The label printer 9 may print a label item on an adhesive media. The operator of the weigh station 2 may apply the product label to the selected product.

At step 906, when a customer selects a selected item from the customer selectable items 52 using the customer operated input module 18, data relating to the selected item can be routed to the customer printer module 8. The customer printer module 8 can print a customer-selected print item based on the selected item on a non-adhesive media. Step 906 may take place in parallel with step 905. The operator of the weigh station 2 may then bundle the customer-selected print item with the labeled product.

At step 907, the customer may have the option of selecting an additional product. If the customer does select another product steps 902 to 907 are repeated. If the customer does not select an additional product at step 907 the method 900 ends at step 908 where the operator hands all labeled products and the customer-selected print item to the customer. The customer continues shopping or proceeds to the store check-out.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

I claim:

1. A system for providing information to a customer, the system comprising:
   a weigh station, the weigh station comprising an input module for receiving a product identifier corresponding to a product and a scale for weighing the product;
   a storage module for storing product information for a plurality of products;
   an information retrieval module for identifying a related information profile from the product information based on the product identifier, the information retrieval module being linked for communication to the input module and to the storage module; and
   an interactive customer display for displaying visual information based on the related information profile to the customer, the interactive customer display being linked for communication to the information retrieval module to receive the related information profile, wherein the visual information comprises a plurality of customer-selectable items, and the interactive customer display comprises a customer-operated input module operable by the customer to select a selected item from the plurality of customer-selectable items.

2. The system as defined in claim 1 wherein the customer-operated input module comprises an active portion of the interactive customer display, the active portion being touchable by the customer to select the selected item from the plurality of customer-selectable items.

3. The system as defined in claim 1 wherein the interactive customer display and the weigh station are located in a store;
the product information comprises an inventory list for identifying a plurality of store products, each store product being available in the store; and
each customer-selectable item in the plurality of customer-selectable items identifies at least one store product in the plurality of store products.

4. The system as defined in claim 3 wherein for each customer-selectable item in the plurality of customer-selectable items, the at least one store product identified differs from the product.

5. The system as defined in claim 3 further comprising a customer printer module for printing a customer-selected print item based on the selected item, the customer printer module being linked for communication to the interactive customer display.

6. The system as defined in claim 3 further comprising a point of sale station for purchasing the product, wherein, for each customer-selectable item in the plurality of customer-selectable items
the customer-selected print item comprises a discount code for specifying a discount for the at least one store product identified by the customer-selectable item; and,
the point of sale station comprises a scanner for scanning the discount code and a price calculation module for calculating a total purchase price based on a price of the product and the at least one store product less the discount, wherein the scanner is linked for communication to the price calculation module.

7. The system as defined in claim 3 further comprising a point of sale station for purchasing the product, wherein, for each customer-selectable item in the plurality of customer-selectable items
the customer-selectable item specifies a discount for the at least one store product identified by the customer-selectable item; and,
the point of sale station comprises a price calculation module for calculating a total purchase price based on a price of the product and the at least one store product less the discount, wherein the price calculation module is linked for communication with the interactive customer display.

8. The system as defined in claim 3 wherein
each store product in the plurality of store products is located at an associated location in the store;
the product information comprises store product location information for indicating the associated location for each store product in the plurality of store products; and,
for each customer-selectable item in the plurality of customer-selectable items, at least one of the interactive customer display and the customer-selectable print item is configured to identify the associated location in the store of the at least one store product.

9. The system as defined in claim 1 further comprising:
a customer session controller operable by an operator for indicating when a customer session begins and ends; and
a disabling module for rendering the selected item from the plurality of customer-selectable items no longer selectable by the customer for printing during the customer session.

10. The system as defined in claim 1 further comprising:
a customer session controller operable by an operator for indicating when a customer session begins and ends; and
a disabling module for rendering the plurality of customer-selectable items no longer selectable by the customer for printing during the customer session.

11. The system as defined in claim 1 further comprising:
a customer session controller operable by an operator for indicating when a customer session begins and ends; and
a timer module for determining and storing a customer session duration using a timer, wherein the timer starts when the customer session starts and the timer stops when the customer session ends.

12. The system as defined in claim 5 further comprising a label printer for printing a label item on an adhesive media, the label item being attachable to the product, wherein the customer printer module is operable to print the customer selected print item on a non-adhesive media.

13. The system as defined in claim 5 wherein when the customer selected print item is printed,
the information retrieval module is operable to refresh the interactive customer display to display a second plurality of customer-selectable items based on the product and the customer selected print item,
the customer-operated input module is operable by the customer to select a second selected item from the second plurality of customer-selectable items, and
the customer printer module is operable to print a second customer selected print item based on the second selected item.

14. A method for providing information to a customer, the method comprising:
storing product information for a plurality of products;
receiving a product identifier corresponding to a product at a weigh station comprising a scale for weighing the product;
identifying a related information profile from the product information based on the product identifier; and
establishing an interactive weigh station session between the customer and an interactive customer display comprising a customer operated input module, wherein the interactive weigh station session comprises:
displaying visual information based on the related information profile, wherein the visual information comprises a plurality of customer-selectable items; and
receiving a selected item from the customer operated input module, the customer operated input module being operable by the customer to select the selected item from the plurality of customer-selectable items.

15. The method as defined in claim 14 wherein the interactive weigh station session further comprises
identifying an additional related information profile from the product information based on the selected item; and
refreshing the related information profile to display visual information based on the additional related information profile.

16. The method of claim 14 further comprising printing a customer selected print item based on the selected item.

17. The method of claim 16 wherein the plurality of customer-selectable items identify a plurality of discount products; and, the customer selected print item comprises a discount coupon for a discount product identified by the selected item.

18. The method of claim 16 wherein the plurality of customer-selectable items identify a plurality of recipes, wherein each recipe in the plurality of recipes lists the product as an ingredient; and, the customer selected print item comprises a recipe identified by the selected item.

19. The method of claim 18 wherein the customer selected print item further comprises a discount coupon for an ingredient product listed in the recipe identified by the selected item, the ingredient product being different from the product.

20. The method of claim 14 wherein the visual information identifies a discount on the product, the discount being contingent on a purchase of a second product and the method further comprises transmitting a discount code readable by a point of sale terminal indicating the discount, the product and the second product.

21. The method of claim 14 wherein the product information comprises a product type and a product brand for at least one product in the plurality of products; and, if the product identifier corresponds to the at least one product, then at least one customer-selectable product in the plurality of customer-selectable products identifies a discount coupon for a competitive product, wherein the competitive product and the product correspond in product type and differ in product brand.

22. The method of claim 14 further comprising identifying a second related information profile from the product information based on at least one of the product and the selected item; and continuing the interactive weigh station session between the customer and the interactive customer display, wherein the continued interactive weigh station session comprises:

displaying visual information based on the second related information profile, wherein the visual information comprises a second plurality of customer-selectable items; and receiving a second selected item from the customer operated input module, the customer operated input module being operable by the customer to select the second selected item from the second plurality of customer-selectable items.

23. The method of claim 22 wherein the selected item is a recipe that lists a recipe product as an ingredient; and the second plurality customer-selectable items identify a discount coupon for the recipe product.

24. The method of claim 22 wherein the selected item is a discount coupon for a discount product; and the second plurality customer-selectable items comprises a recipe that lists the discount product as an ingredient.

* * * * *